(12) United States Patent
Kim

(10) Patent No.: US 8,143,738 B2
(45) Date of Patent: Mar. 27, 2012

(54) HYPER-SURFACE WIND GENERATOR

(75) Inventor: Chong-Kyu Kim, Fort Lee, NJ (US)

(73) Assignee: Infinite Wind Energy LLC, Ridgefield, NJ (US)

( * ) Notice: Subject to any disclaimer, the term of this patent is extended or adjusted under 35 U.S.C. 154(b) by 522 days.

(21) Appl. No.: 12/222,272

(22) Filed: Aug. 6, 2008

(65) Prior Publication Data
US 2010/0032958 A1 Feb. 11, 2010

(51) Int. Cl.
*F02P 6/00* (2006.01)
(52) U.S. Cl. ............................................. 290/55; 290/54
(58) Field of Classification Search .................. 290/55
See application file for complete search history.

(56) References Cited

U.S. PATENT DOCUMENTS

| | | |
|---|---|---|
| 232,205 A | 9/1880 | Preston |
| 1,586,914 A | 6/1926 | Palm |
| 2,032,651 A | 3/1936 | Donovan |
| 3,338,644 A * | 8/1967 | Atkinson et al. ............. 310/90.5 |
| 3,826,965 A | 7/1974 | Bringol |
| 3,861,025 A | 1/1975 | Sims |
| 3,918,310 A * | 11/1975 | Evans et al. .................. 74/5.6 D |
| 3,979,651 A | 9/1976 | Bringol |
| 4,088,352 A | 5/1978 | Kling |
| 4,115,027 A | 9/1978 | Thomas |
| 4,115,030 A | 9/1978 | Inagaki et al. |
| 4,134,707 A | 1/1979 | Ewers |
| 4,228,391 A | 10/1980 | Owen |
| 4,274,809 A | 6/1981 | Delgado et al. |
| 4,289,444 A | 9/1981 | Monk et al. |
| 4,313,710 A | 2/1982 | La Ferte |
| 4,321,005 A | 3/1982 | Black |
| 4,365,929 A | 12/1982 | Retz |
| 4,368,418 A | 1/1983 | DeMello et al. |
| 4,446,416 A | 5/1984 | Wanlass |
| 4,449,053 A | 5/1984 | Kutcher |
| 4,450,389 A | 5/1984 | Frister et al. |
| 4,468,603 A | 8/1984 | Vander Meer et al. |
| 4,468,725 A | 8/1984 | Venturini |
| 4,486,143 A | 12/1984 | McVey |
| 4,543,513 A | 9/1985 | Checchetti |
| 4,644,210 A | 2/1987 | Meisner et al. |
| 4,656,572 A | 4/1987 | Caputo et al. |
| 4,716,329 A | 12/1987 | Oh |

(Continued)

FOREIGN PATENT DOCUMENTS
CA 2 299 154 A1 8/2001
(Continued)

*Primary Examiner* — Tulsidas C Patel
*Assistant Examiner* — Iraj A Mohandesi
(74) *Attorney, Agent, or Firm* — Morgan, Lewis & Bockius LLP

(57) ABSTRACT

An electric generator capable of generating electric power using kinetic energy of wind includes a first plurality of rotor plates, a second plurality of rotor plates, and a first plurality of blades capable of driving the first plurality of rotor plates, a second plurality of blades being formed to enable counter-rotation with respect to the first plurality of blades, wherein rotation of the first plurality of rotor plates relative to the second plurality of rotor plates induces electricity in a plurality of coils disposed on the second plurality of rotor plates, and wherein at least one of the first and second plurality of rotor plates are arranged co-axially with the shaft such that respective radii of the at least one of the first and second plurality of rotor plates are varied along the axial direction.

9 Claims, 20 Drawing Sheets

U.S. PATENT DOCUMENTS

| | | | |
|---|---|---|---|
| 4,723,104 A | 2/1988 | Rohatyn | |
| 4,763,032 A | 8/1988 | Bramm et al. | |
| 4,776,762 A | 10/1988 | Blowers, Sr. | |
| 4,808,868 A | 2/1989 | Roberts | |
| 4,926,061 A | 5/1990 | Arreola, Jr. | |
| 4,926,105 A | 5/1990 | Mischenko et al. | |
| 4,979,871 A | 12/1990 | Reiner | |
| 4,996,457 A | 2/1991 | Hawset et al. | |
| 5,010,288 A | 4/1991 | Poline | |
| 5,133,637 A | 7/1992 | Wadsworth | |
| 5,140,211 A | 8/1992 | Ucida | |
| 5,140,247 A | 8/1992 | Verbos | |
| 5,157,297 A | 10/1992 | Ucida | |
| 5,192,212 A | 3/1993 | Kim | |
| 5,226,806 A | 7/1993 | Lubbers | |
| 5,315,159 A | 5/1994 | Gribnau | |
| 5,334,898 A | 8/1994 | Skybyk | |
| 5,518,367 A | 5/1996 | Verastegui | |
| 5,520,505 A | 5/1996 | Weisbrich | |
| 5,572,080 A | 11/1996 | Nakamura et al. | |
| 5,584,655 A | 12/1996 | Deering | |
| 5,719,458 A | 2/1998 | Kawai | |
| 5,726,516 A | 3/1998 | Randall | |
| 5,771,566 A | 6/1998 | Pop, Sr. | |
| 5,877,578 A | 3/1999 | Mitcham et al. | |
| 5,977,684 A | 11/1999 | Lin | |
| 6,011,337 A | 1/2000 | Lin et al. | |
| 6,054,837 A | 4/2000 | Edelson | |
| 6,087,738 A | 7/2000 | Hammond | |
| 6,088,906 A | 7/2000 | Hsu et al. | |
| 6,113,350 A | 9/2000 | Liu | |
| 6,127,764 A | 10/2000 | Török | |
| 6,147,415 A * | 11/2000 | Fukada | 290/55 |
| 6,157,147 A | 12/2000 | Lin | |
| 6,172,509 B1 | 1/2001 | Cash et al. | |
| 6,177,750 B1 | 1/2001 | Tompkin | |
| 6,198,181 B1 | 3/2001 | Ali et al. | |
| 6,213,736 B1 | 4/2001 | Weisser | |
| 6,242,818 B1 | 6/2001 | Smedley | |
| 6,259,180 B1 | 7/2001 | Pop, Sr. | |
| 6,278,197 B1 | 8/2001 | Appa | |
| 6,308,140 B1 | 10/2001 | Dowling et al. | |
| 6,320,273 B1 | 11/2001 | Nemec | |
| 6,417,578 B1 | 7/2002 | Chapman et al. | |
| 6,462,430 B1 | 10/2002 | Joong et al. | |
| 6,504,260 B1 | 1/2003 | Debleser | |
| 6,566,764 B2 | 5/2003 | Rebsdorf et al. | |
| 6,570,361 B1 | 5/2003 | Edelson | |
| 6,577,022 B2 | 6/2003 | Joong et al. | |
| 6,601,287 B2 | 8/2003 | Pop, Sr. | |
| 6,688,842 B2 | 2/2004 | Boatner | |
| 6,720,686 B1 | 4/2004 | Horst | |
| 6,727,631 B2 | 4/2004 | Nishimura | |
| 6,794,783 B2 | 9/2004 | Tu et al. | |
| 6,849,982 B2 | 2/2005 | Haydock et al. | |
| 6,856,038 B2 | 2/2005 | Rebsdorf et al. | |
| 6,856,040 B2 | 2/2005 | Feddersen et al. | |
| 6,857,846 B2 | 2/2005 | Miller | |
| 6,864,661 B2 | 3/2005 | Edelson | |
| 6,868,815 B2 | 3/2005 | Carden | |
| 6,870,280 B2 | 3/2005 | Pechler | |
| 6,876,176 B2 | 4/2005 | Stefanovic et al. | |
| 6,922,037 B2 | 7/2005 | Edelson | |
| 6,926,491 B2 | 8/2005 | Migler | |
| 6,933,625 B2 | 8/2005 | Feddersen et al. | |
| 6,943,473 B2 | 9/2005 | Furuse et al. | |
| 6,945,752 B1 | 9/2005 | Wobben | |
| 6,952,058 B2 | 10/2005 | McCoin | |
| 6,975,044 B2 | 12/2005 | Okamoto | |
| 6,979,175 B2 | 12/2005 | Drake | |
| 7,008,171 B1 | 3/2006 | Whitworth | |
| 7,008,172 B2 | 3/2006 | Selsam | |
| 7,015,595 B2 | 3/2006 | Feddersen et al. | |
| 7,034,499 B2 | 4/2006 | Kerlin, IV et al. | |
| 7,042,109 B2 | 5/2006 | Gabrys | |
| 7,098,552 B2 | 8/2006 | McCoin | |
| 7,109,599 B2 | 9/2006 | Watkins | |
| 7,109,629 B2 | 9/2006 | Al-Khayat et al. | |
| 7,116,006 B2 | 10/2006 | McCoin | |
| 7,122,932 B2 | 10/2006 | Narayanan et al. | |
| 7,154,191 B2 | 12/2006 | Jansen et al. | |
| 7,154,193 B2 | 12/2006 | Jansen et al. | |
| 7,205,678 B2 | 4/2007 | Casazza et al. | |
| 7,215,038 B2 | 5/2007 | Bacon | |
| 7,218,013 B2 | 5/2007 | Platt | |
| 7,230,348 B2 | 6/2007 | Poole | |
| 7,294,948 B2 | 11/2007 | Wasson et al. | |
| 7,309,934 B2 | 12/2007 | Tu et al. | |
| 7,309,938 B1 | 12/2007 | Smith | |
| 7,312,550 B2 | 12/2007 | Dooley | |
| 7,329,099 B2 | 2/2008 | Hartman | |
| 7,332,837 B2 | 2/2008 | Ward et al. | |
| 7,336,013 B2 | 2/2008 | Pizzichil | |
| 7,342,330 B2 | 3/2008 | Sakamoto et al. | |
| 7,345,377 B2 | 3/2008 | Bacon | |
| 7,358,637 B2 | 4/2008 | Tapper | |
| 7,362,026 B2 | 4/2008 | Morozov et al. | |
| 7,375,449 B2 | 5/2008 | Butterfield | |
| 7,411,324 B2 | 8/2008 | Kusumi | |
| 7,550,864 B2 * | 6/2009 | Anderson et al. | 290/55 |
| 7,649,274 B2 * | 1/2010 | Burt | 290/43 |
| 2002/0047426 A1 | 4/2002 | Pop, Sr. | |
| 2002/0093200 A1 | 7/2002 | Stefanovic et al. | |
| 2002/0116811 A1 | 8/2002 | Pop, Sr. | |
| 2002/0145357 A1 | 10/2002 | Li et al. | |
| 2003/0015931 A1 | 1/2003 | Nishimura | |
| 2003/0059306 A1 | 3/2003 | Miller | |
| 2003/0094929 A1 | 5/2003 | Pendell | |
| 2003/0173931 A1 | 9/2003 | Edelson | |
| 2003/0230675 A1 | 12/2003 | St. Clair | |
| 2004/0076518 A1 | 4/2004 | Drake | |
| 2004/0184909 A1 | 9/2004 | Miller | |
| 2004/0197188 A1 | 10/2004 | Drake | |
| 2004/0247438 A1 | 12/2004 | McCoin | |
| 2005/0082839 A1 | 4/2005 | McCoin | |
| 2005/0104461 A1 | 5/2005 | Hatz et al. | |
| 2006/0006658 A1 | 1/2006 | McCoin | |
| 2006/0012182 A1 | 1/2006 | McCoin | |
| 2006/0066157 A1 | 3/2006 | Narayanan et al. | |
| 2006/0066158 A1 | 3/2006 | Pizzichil | |
| 2006/0263198 A1 | 11/2006 | Kinkaid | |
| 2006/0273683 A1 | 12/2006 | Caprio et al. | |
| 2007/0013250 A1 | 1/2007 | Nickoladze et al. | |
| 2007/0024249 A1 | 2/2007 | Dooley | |
| 2007/0053780 A1 | 3/2007 | Ruffner et al. | |
| 2007/0071604 A1 | 3/2007 | Suzuki | |
| 2007/0090838 A1 | 4/2007 | Hennig | |
| 2007/0177970 A1 | 8/2007 | Yokoi | |
| 2007/0199405 A1 | 8/2007 | Kobayashi | |
| 2007/0216244 A1 | 9/2007 | Edelson | |
| 2007/0224029 A1 | 9/2007 | Yokoi | |
| 2007/0252447 A1 | 11/2007 | Ionel et al. | |
| 2007/0278883 A1 | 12/2007 | Marcenaro et al. | |
| 2007/0296219 A1 | 12/2007 | Nica | |
| 2008/0007133 A1 | 1/2008 | Onimaru et al. | |
| 2008/0008588 A1 | 1/2008 | Hartman | |
| 2008/0023964 A1 | 1/2008 | Sureshan | |
| 2008/0042507 A1 | 2/2008 | Edelson | |
| 2008/0048457 A1 | 2/2008 | Patel et al. | |
| 2008/0054731 A1 | 3/2008 | Tu et al. | |
| 2008/0129138 A1 | 6/2008 | Pizzichil | |
| 2008/0149445 A1 | 6/2008 | Kern et al. | |
| 2008/0185926 A1 | 8/2008 | Dessirier et al. | |
| 2008/0185934 A1 | 8/2008 | Verhoeven | |
| 2008/0201935 A1 | 8/2008 | Nakayama et al. | |

FOREIGN PATENT DOCUMENTS

| | | |
|---|---|---|
| CA | 2 481 341 A1 | 4/2006 |
| CN | 1455081 A | 11/2003 |
| CN | 10 110 3198 A | 1/2008 |
| CN | 10 119 9364 A | 1/2008 |
| DE | 24 05 767 | 8/1975 |
| DE | 10 2005 020 257 A1 | 11/2006 |
| EP | 1 115 977 B1 | 5/2004 |
| EP | 1 406 011 B1 | 10/2005 |
| EP | 1 641 102 A1 | 3/2006 |
| GB | 2 386 161 A | 9/2003 |

| | | |
|---|---|---|
| GB | 2 396 888 A | 7/2004 |
| JP | 60/45787 | 3/1985 |
| JP | 2001/289148 | 10/2001 |
| JP | 2002/81367 | 3/2002 |
| JP | 2002/130110 A | 5/2002 |
| JP | 2002/188559 | 7/2002 |
| JP | 2002-335650 | 11/2002 |
| JP | 2003/090280 A | 3/2003 |
| JP | 2005/233015 | 9/2005 |
| JP | 2006-115666 | 4/2006 |
| JP | 2007-174767 | 7/2007 |
| JP | 2007/205341 | 8/2007 |
| JP | 2008/115809 | 5/2008 |
| JP | 2008/121663 | 5/2008 |
| KR | 10-2009-0096672 | 9/2009 |
| MD | 20 040 214 A | 2/2004 |
| MD | 2 431 B1 | 4/2004 |
| MD | 20 050 135 A | 10/2006 |
| RO | 104018 A * | 6/1989 |
| WO | 95/21326 | 8/1995 |
| WO | 96/10695 | 4/1996 |
| WO | 96/18815 | 6/1996 |
| WO | 01/46564 A1 | 6/2001 |
| WO | 2004/046544 A2 | 6/2004 |
| WO | 2004/046544 A3 | 6/2004 |
| WO | 2004/051080 | 6/2004 |
| WO | 2005/005826 A1 | 1/2005 |
| WO | 2005/008065 A1 | 1/2005 |
| WO | 2005/081885 | 9/2005 |
| WO | 2006/007568 | 1/2006 |
| WO | 2006/022590 | 3/2006 |
| WO | 2006/066310 A1 | 6/2006 |
| WO | 2006/071689 A2 | 7/2006 |
| WO | 2006/089425 | 8/2006 |
| WO | 2006/110125 A3 | 10/2006 |
| WO | 2007/045851 A1 | 4/2007 |
| WO | 2008/070369 | 6/2008 |
| WO | 2008/070369 A2 | 6/2008 |

* cited by examiner

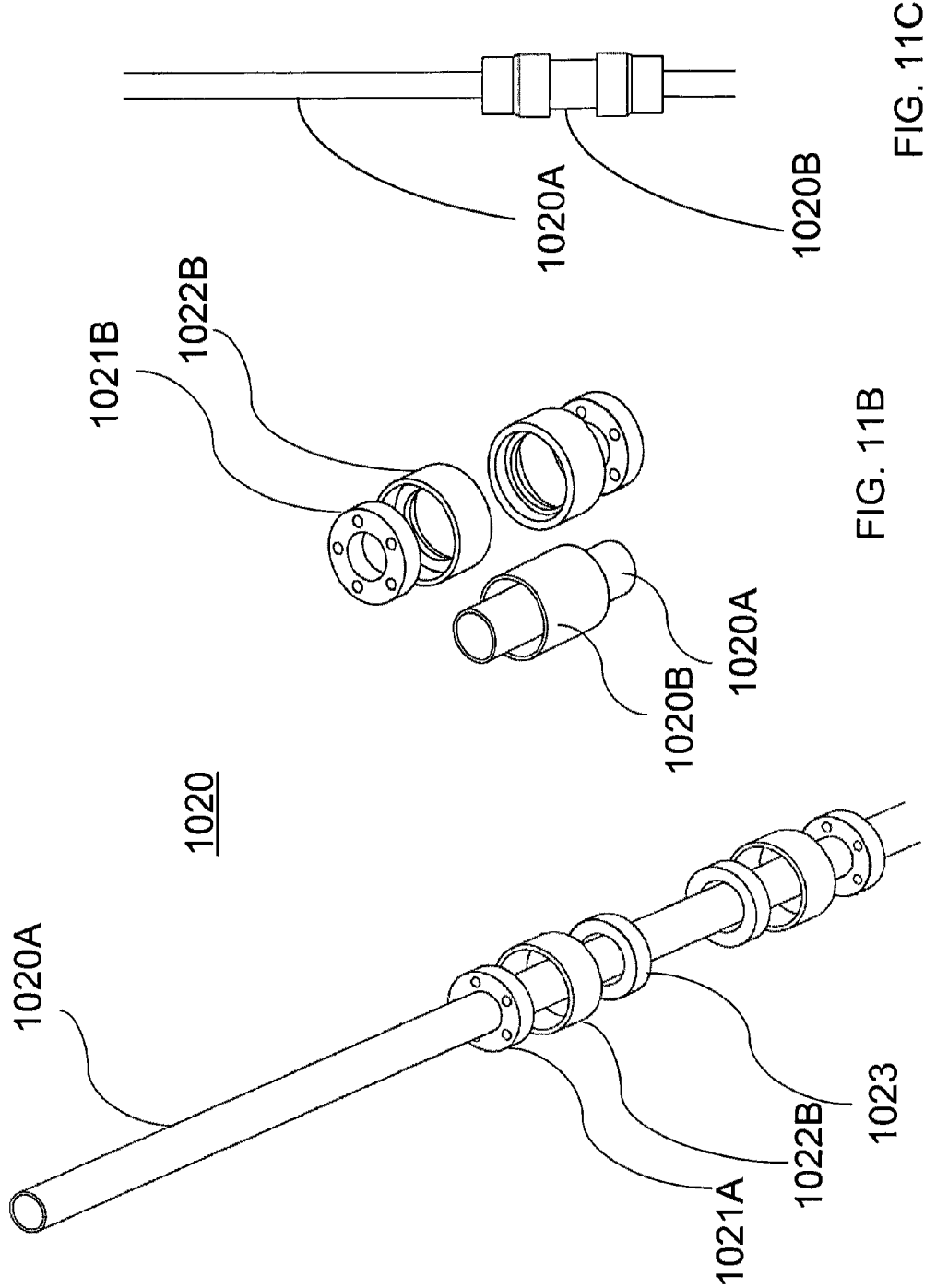

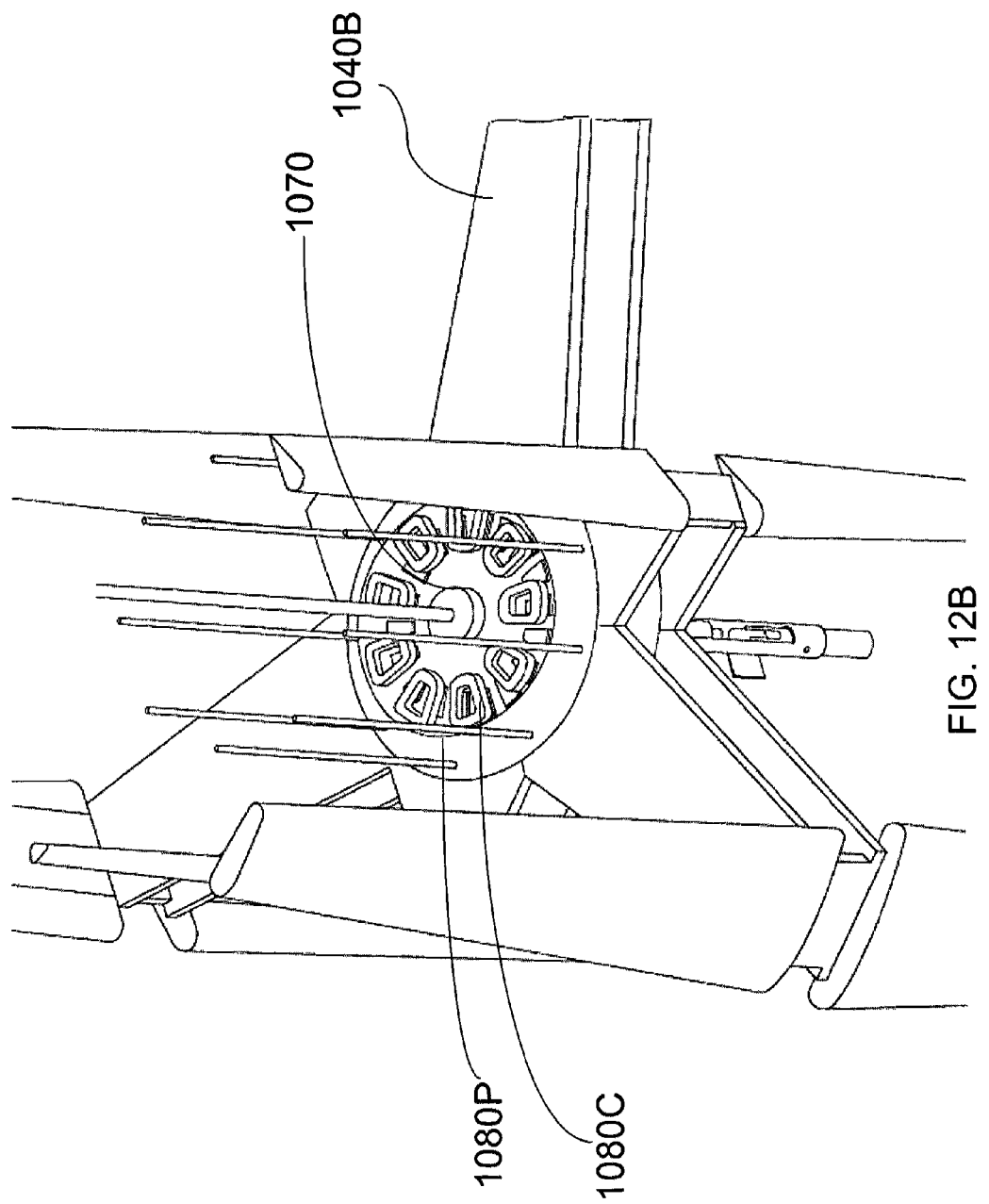

HYPER-SURFACE WIND GENERATOR

BACKGROUND OF THE INVENTION

1. Field of the Invention

The present invention relates to power generators, and more particularly, to stackable wind power generators.

2. Discussion of the Related Art

Wind generators create electricity by converting kinetic energies of wind into electric energy. Wind powered generators have great advantages over other generators. Wind generators are not only environmentally safe but also economically sound and sustainable. Unlike fuel generators, there is no need to purchase fuel. The source of energy is wind, which can be obtained in nature. Because wind has kinetic energy to produce electricity, there is no byproduct produced. Accordingly, there is almost zero pollution.

A wind generator converts mechanical energy from the wind into electrical energy using electromagnetic induction. Small wind generators that create 700-1,000 Watts can be easily made. However, there are limitations on how much energy a wind generator can produce. For example, building wind generators of bigger than 2,000 Watts is a major project requiring very large construction. Conventional wind generators that are large are unstable and inefficient.

SUMMARY OF THE INVENTION

Accordingly, the present invention is directed to stackable hyper-surface wind generators that substantially obviates one or more problems due to limitations and disadvantages of the related art.

An object of the present invention is to provide a compact wind generator capable of generating a large amount of electrical energy.

Another object of the present invention is to provide a high efficiency wind generator in which a plurality of rotors are stacked in parallel.

Another object of the present invention is to provide a high efficiency wind generator capable of implementing the counter-rotation mechanism.

Another object of the present invention is to provide a reliable wind generator in which vibration in undesired directions is suppressed.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the stackable hyper-surface wind generator includes a plurality of stator plates, a plurality of rotor plates and a plurality of blades capable of driving the plurality of rotor plates, wherein rotation of the plurality of rotor plates relative to the plurality of stator plates induces electricity in a plurality of coils disposed on each stator plate, and wherein at least one of the stator plates and the rotor plates are arranged co-axially with a shaft such that respective radii of the at least one of the stator plates and rotor plates are varied along the axial direction.

In another aspect, an electric generator capable of generating electric power using kinetic energy of wind includes a first plurality of rotor plates, a second plurality of rotor plates, and a first plurality of blades capable of driving the first plurality of rotor plates, a second plurality of blades being formed to enable counter-rotation with respect to the first plurality of blades, wherein rotation of the first plurality of rotor plates relative to the second plurality of rotor plates induces electricity in a plurality of coils disposed on the second plurality of rotor plates, and wherein at least one of the first and second plurality of rotor plates are arranged co-axially with the shaft such that respective radii of the at least one of the first and second plurality of rotor plates are varied along the axial direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 11A is a perspective view of the counter-rotatable inner pipe within the VAWT generator according to the exemplary embodiment of FIG. 7;

FIG. 11B is a perspective view of the counter-rotatable outer pipe within the VAWT generator according to the exemplary embodiment of FIG. 7;

FIG. 11C is a perspective view of the counter-rotating pipes within the VAWT generator according to the exemplary embodiment of FIG. 7;

FIG. 12A-12C are perspective views showing the method of making the counter-rotating VAWT generator according to the exemplary embodiment of FIG. 7;

DETAILED DESCRIPTION OF THE EMBODIMENTS

Reference will now be made in detail to the embodiments of the present invention, examples of which are illustrated in the accompanying drawings.

When an inductive element, i.e., a wire or a coil, is placed within a magnetic field and when the inductive element rotates within the magnetic field, current is induced within the inductive element. The magnitude of the induced current depends on the strength of the magnetic field, the length of the inductive element, and the speed with which the inductive element moves within the magnetic field. The strength of the magnetic field can be enhanced by using magnets with higher magnetization. However, there are limitations on the strength of the magnets due to intrinsic material properties. Accordingly, in accordance with aspects of the present invention, efficiency of the wind generator is enhanced by changing the structure and design of the wind generator. In an exemplary embodiment of the present invention, a plurality of rotors and a plurality of stators are stacked to enhance efficiency, thereby increasing the magnitude of the induced current.

Figure 1:
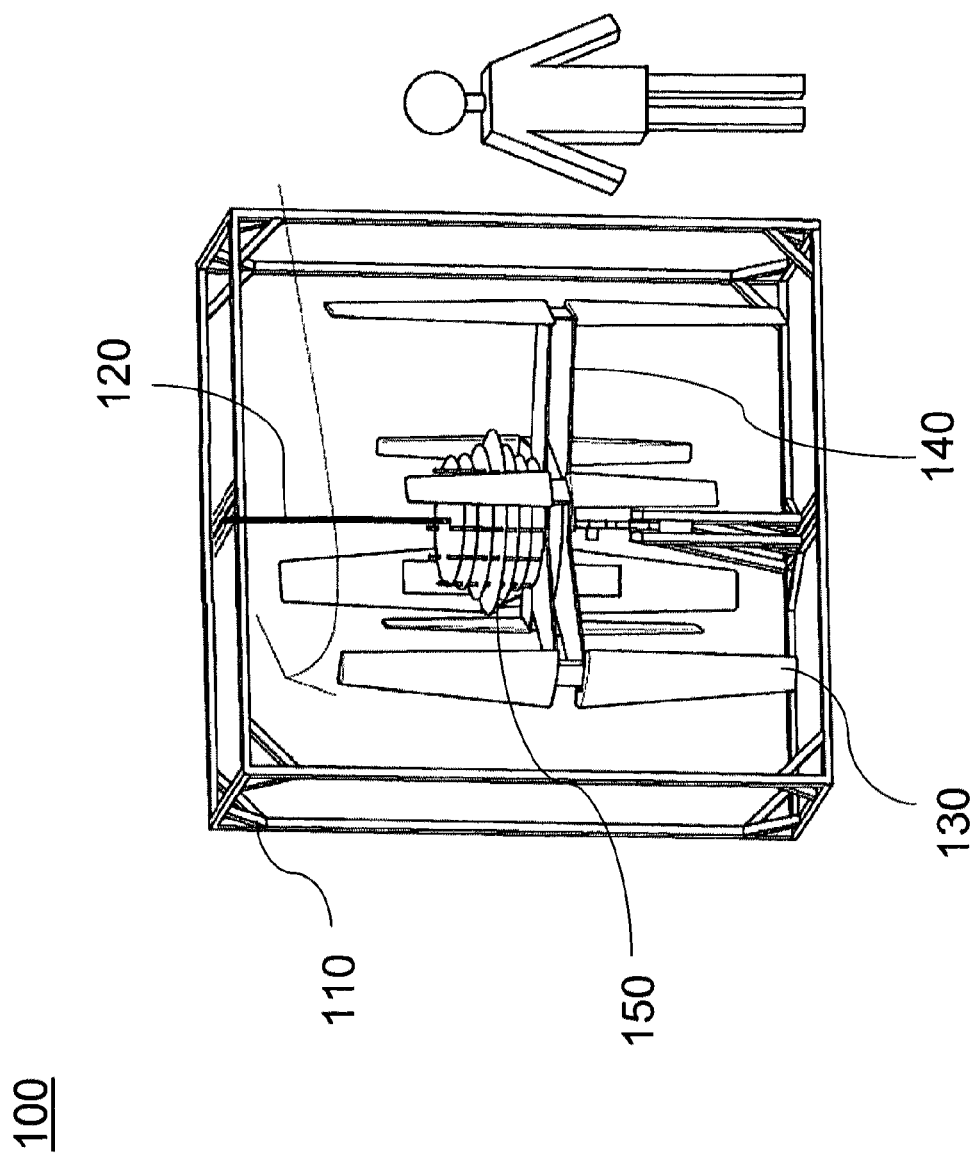
FIG. 1 is a perspective view of a vertical-axis wind turbine (VAWT) generator according to an exemplary embodiment of the present invention.
Figure 2:
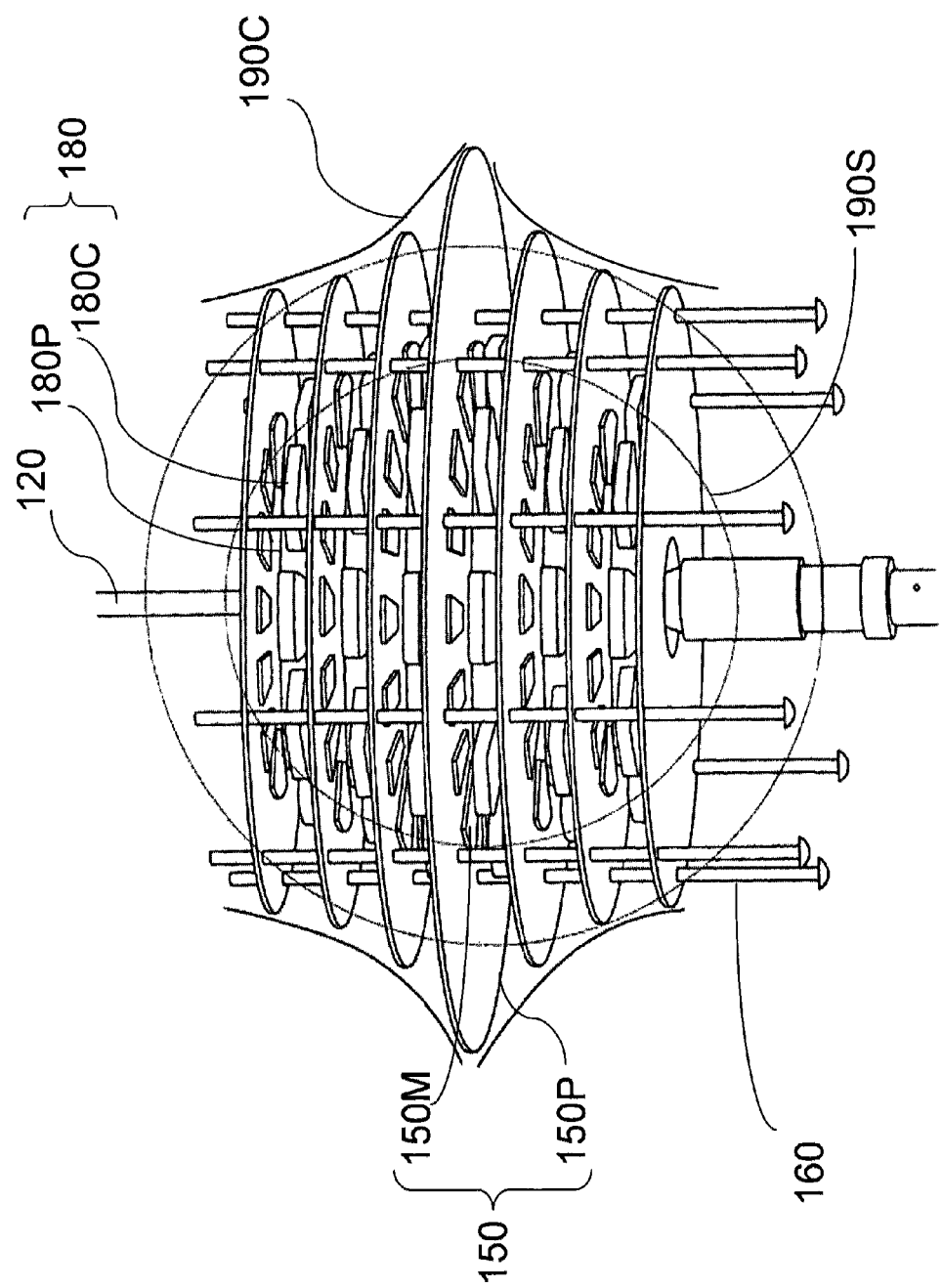
FIG. 2 is a perspective view of a stackable rotors and stators within the VAWT generator according to the exemplary embodiment of FIG. 1.
Figure 3:
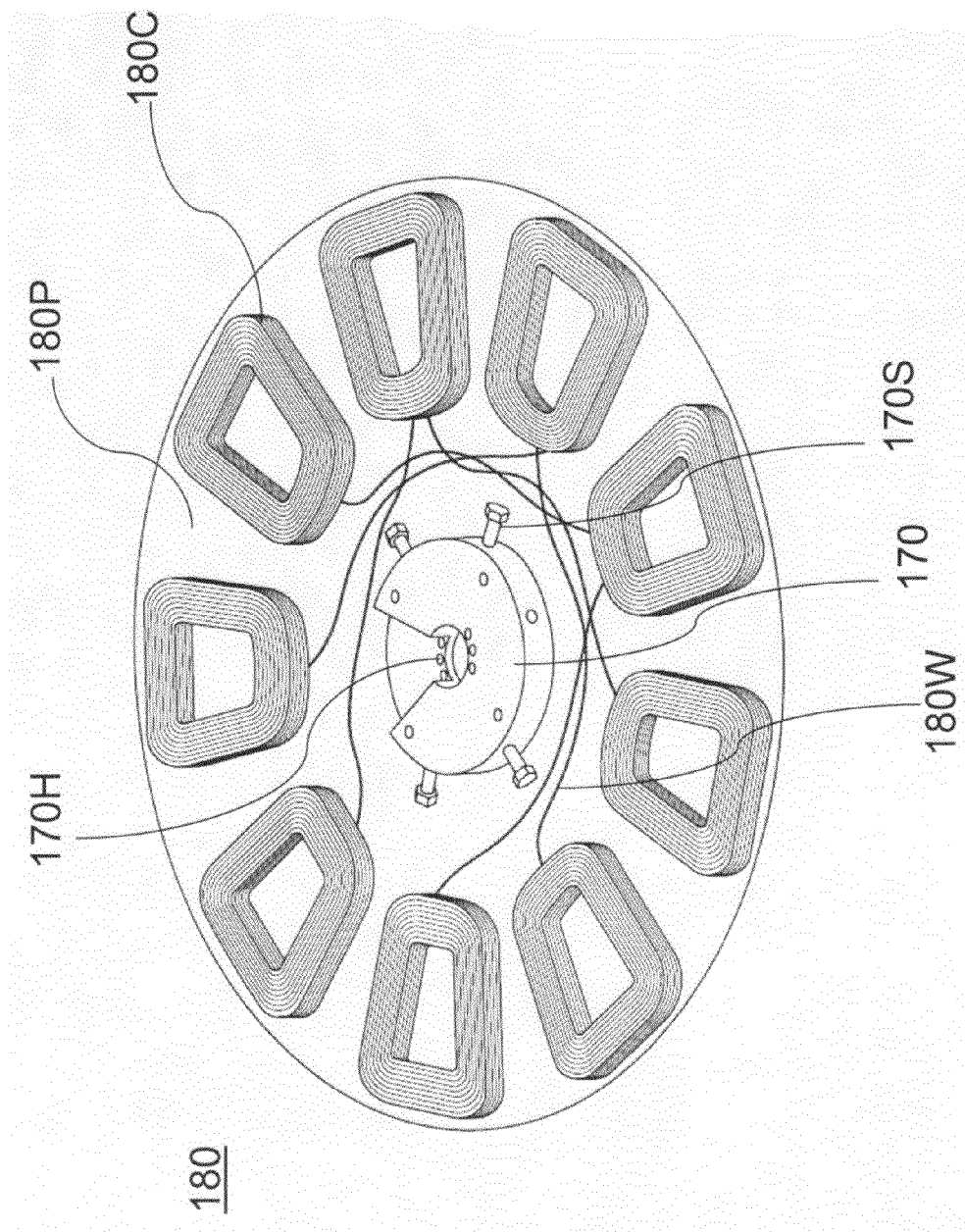
FIG. 3 is a perspective view of a single stator including a plurality of coils within the VAWT generator according to the exemplary embodiment of FIG. 1.
Figure 4:
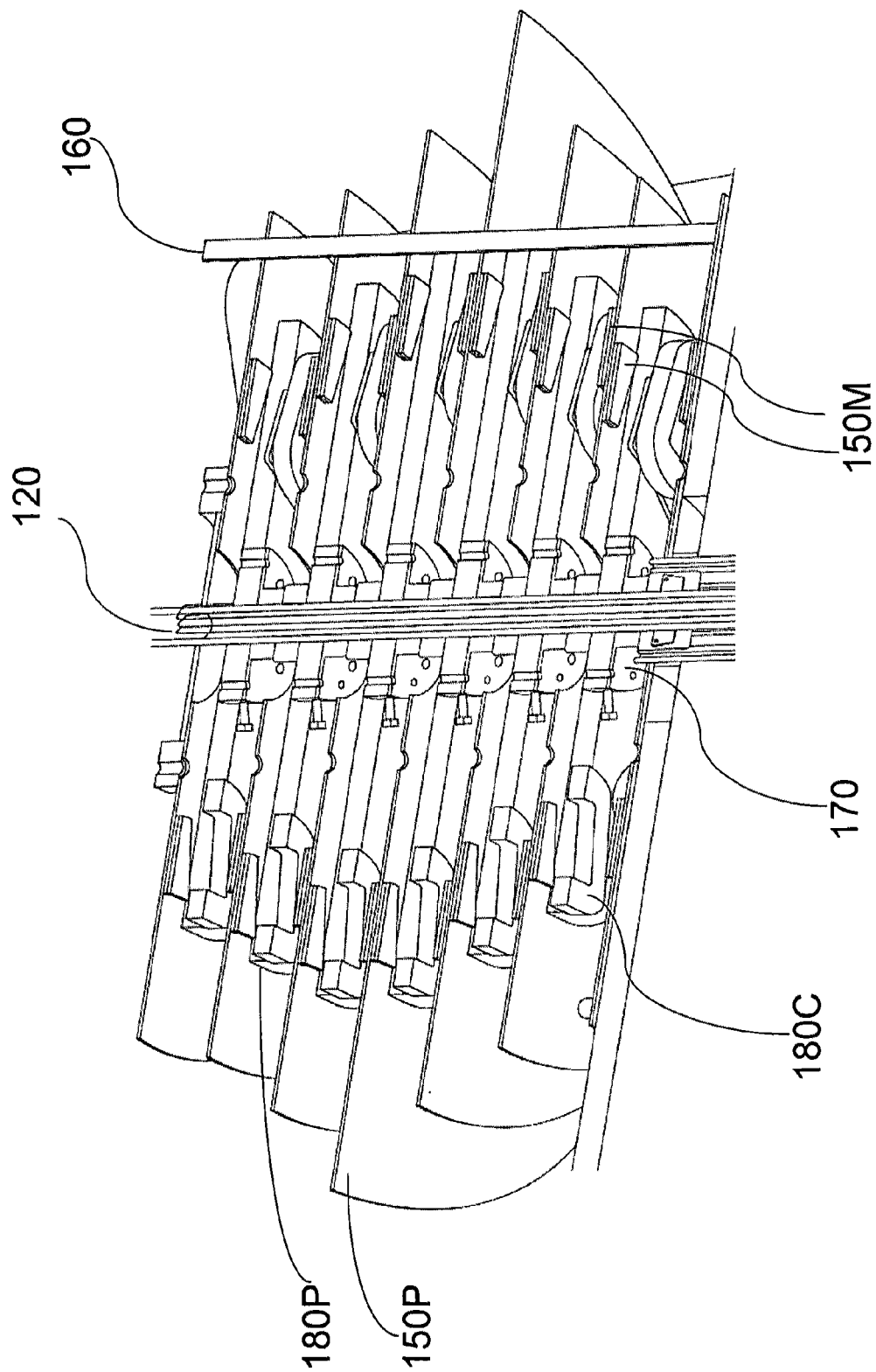
FIG. 4 is a cross-sectional view of a stackable rotors and stators within the VAWT generator according to the exemplary embodiment of FIG. 1.

FIG. 1 is a perspective view of a vertical-axis wind turbine (VAWT) generator according to an exemplary embodiment of the present invention, FIG. 2 is a perspective view of a stackable rotors and stators within the VAWT generator according to the exemplary embodiment of FIG. 1, FIG. 3 is a perspective view of a single stator including a plurality of coils within the VAWT generator according to the exemplary embodiment of FIG. 1, and FIG. 4 is a cross-sectional view of a stackable rotors and stators within the VAWT generator according to the exemplary embodiment of FIG. 1. Key advantages of the VAWT arrangement are that the blades 130 do not have to be pointed into the wind to generate electricity. This is an advantage on sites where the wind direction is highly variable. In other words, VAWTs can utilize winds from varying directions. Vertical-axis turbine generators 100 can be installed on the ground. Alternatively, because the speed of wind is generally faster at a higher altitude, vertical-axis turbine generators 100 can be mounted on towers or building rooftops.

As shown in FIGS. 1-4, an exemplary embodiment of a VAWT generator 100 according to the present invention includes a frame 110, a shaft 120 that is rotatably connected to the frame 110, a plurality of blades 130 that are connected to the shaft 120 through a base 140, a plurality of rotors 150 including a plurality of permanent magnets 150M, which are connected to the rotatable shaft 120, and a plurality of stators 180 including a plurality of coils 180C. The plurality of stators 180 and plurality of rotors 150 within the VAWTs are vertically arranged. The rotating blades 130 within the VAWT generator 100 convert the kinetic energy of wind into rotational momentum of a shaft 120 independent of the direction of the wind. When the plurality of rotors 150 rotate, the plurality of coils 180C and the wires 180W within the plurality of stators 180 experiences change in the magnetic field generated by the plurality of permanent magnets 150M within the plurality of rotors 150. Accordingly, electricity is generated in the plurality of coils 180C and wires 180W within the plurality of stators 180.

As shown in FIGS. 2 and 4, a plurality of rotors 150 includes a plurality of rotor plates 150P and a plurality of alternating magnets 150M. The plurality of rotor plates 150P are fixed with one another by rods 160. Each rotor 150 is interposed between each stator 180 and is stacked to enhance the efficiency of the generator 100, thereby increasing the overall magnitude of the induced current.

As shown in FIG. 3, there are three sets of wires 180W on each stator 180 that electrically connect the plurality of coils 180C to one another within a single stator plate 180P. Of course, more or fewer sets of wires can be used. Although not completely shown, each coil 180C has input and output wires. The input and output wires of each coil that form the three pairs of wires 180W that electrically connect the plurality of coils 180C to one another are shown in FIG. 3. However, the input and output wires of each coil that are connected to pass through the holes 170H within the hub 170 are not shown. Stabilizing screws 170S can be used to cast the wires together with the hub 170. The holes 170H within the hub 170 are used to pass the wires through to the next stack of stator 180. The hub 170 may be made of metal, including aluminum, or other suitable material.

In an exemplary embodiment of the present invention, the wind generator 100 is reliable and stable because vibration in undesired directions due to turbulence can be suppressed. Angular momentum of an object rotating around a reference point is a measure of the extent to which the object will continue to rotate around that point unless an external torque is applied. Mathematically, the angular momentum with respect to a point on the axis around which an object rotates is related to the mass of the object, the velocity of the object, and the distance of the mass to the axis. According to the theory of conservation of angular momentum, a system's angular momentum remains constant unless an external torque acts on it. In other words, torque is the rate at which angular momentum is transferred into or out of the system.

Accordingly, in a closed system, wherein no external torque is applied to the objects within the system, the time derivative of angular momentum, i.e., the torque, is zero. An example of the conservation of angular momentum can be easily seen in an ice skater as he brings his arms and legs closer to the axis of rotation. Because angular momentum is the product of the velocity of the object and the distance of the object to the axis of rotation, the angular velocity of the skater necessarily increases by bringing his body closer to the axis of rotation, thereby decreasing the body's overall moment of inertia.

The plurality of blades 130 of the wind generator 100 are designed to convert linear motions of wind into rotational motions of the plurality of rotors 150. In an ideal condition, the plurality of rotors 150 would only have spin angular momentum wherein the plurality of rotor 150 rotates around the shaft 120. However, because the blades 130 are not ideal and also because the direction of wind is not homogeneous in space, the plurality of rotors 150 not only have spin angular momentum when external torque is applied to the blades 130, but also have non-zero orbital angular momentum. Orbital angular momentum is an orbital motion of the shaft 120 itself, which would cause vibration of the wind generator 100 and further generate friction between the plurality of rotors 150 and the plurality of stators 180. Accordingly, having a non-zero orbital angular momentum would decrease the spin angular momentum thereby degrading the efficiency of the wind generator 100. In the exemplary embodiment of the present invention, the geometric dimensions of the stacked rotors 150 and stators 180 are designed to suppress the orbital angular momentum thereby enhancing the reliability and stability of the wind generator.

Figure 5:
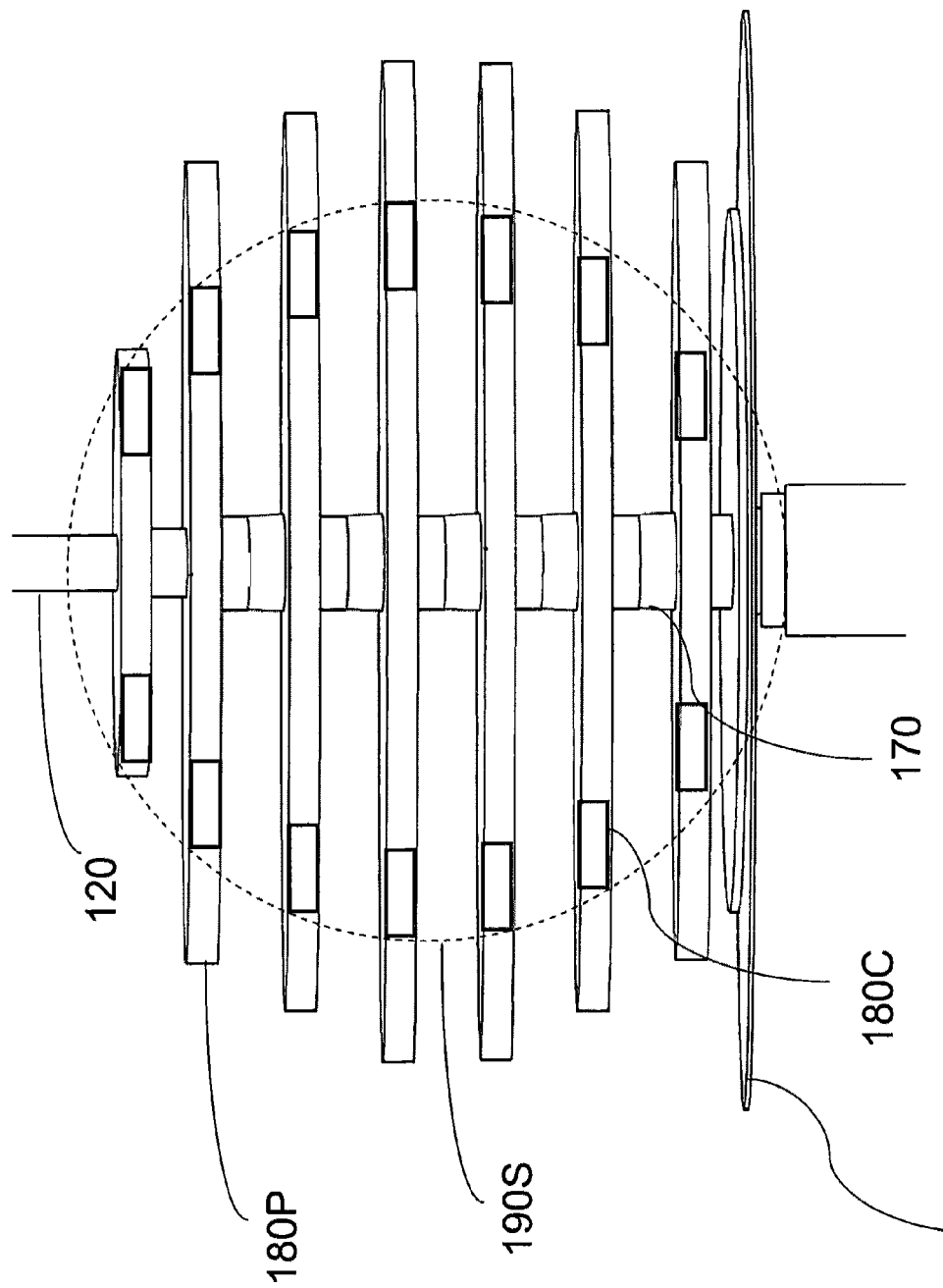
FIG. 5 is a side view of the stackable stators within the VAWT generator according to the exemplary embodiment of FIG. 1.
Figure 6B:
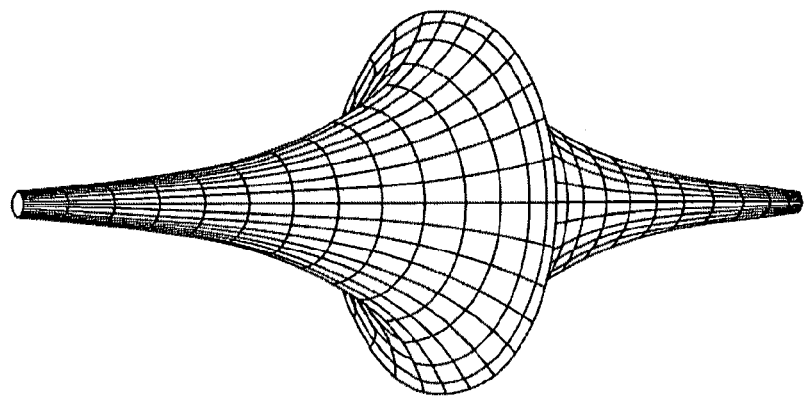
FIG. 6B is a perspective view of an inverse-catenoid.
Figure 6A:
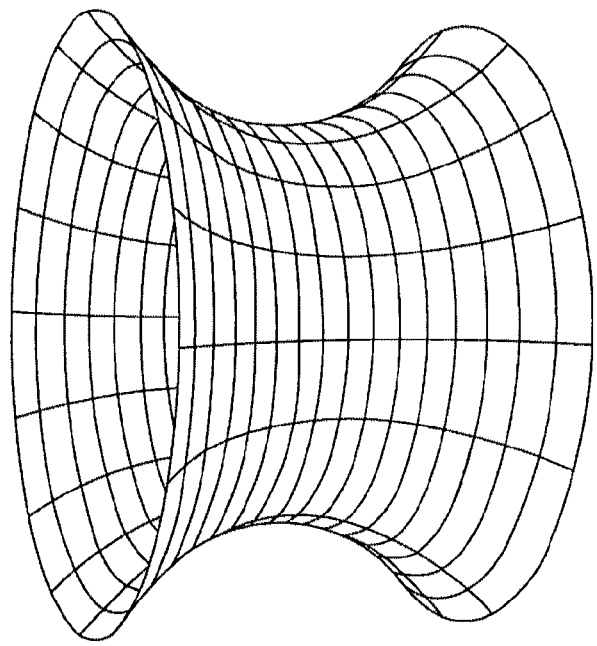
FIG. 6A is a perspective view of a catenoid.

FIG. 5 is a side view of the stackable stators within the VAWT generator according to the exemplary embodiment of FIG. 1. In FIG. 5, the rotors are not shown to simplify the structure. FIG. 6A shows a perspective view of a catenoid and FIG. 6B shows a perspective view of an inverse-catenoid. In particular, a catenoid is a surface of revolution that can be expressed in the following form (Equation 1):

$$x(u,v) = a \cdot \cos(u) \cdot \cos h(v/a)$$

$$y(u,v) = a \cdot \cos h(v/a) \cdot \sin(u)$$

$$z(u,v) = v \qquad \text{[Equation 1]}$$

In addition, an inverse-catenoid is a surface of revolution that can be expressed in the following form (Equation 2):

$$x(u,v) = sech(u) \cdot \cos(v)$$

$$y(u,v) = sech(u) \cdot \sin(v)$$

$$z(u,v) = u - \tan h(u) \qquad \text{[Equation 2]}$$

A catenoid and inverse-catenoid hyper-surfaces are pseudo-spheres that have the same surface area as a sphere. Accordingly, an obvious advantage of having either a catenoid or inverse-catenoid configuration is to have a larger radial center of mass, while maintaining the surface area of the entire generator 100.

As shown in FIG. 5, the plurality of coils 180C within each layer of stator 180 are structured to form a sphere 190S. In addition, as shown in FIG. 2, the plurality of rotor plates 150P are structured to form an inverse-catenoid hyper-surface 190C. These geometric dimensions of the plurality of rotors 150 and stators 180 suppress the orbital angular momentum of the plurality of rotors 150 and stators 180 thereby enhancing the reliability and stability of the wind generator. U.S. Pat. No. 5,192,212 illustrates a hyper-surface orbital model, which represents planetary systems. Although it is merely a model representing the orbiting path of a hyper-surface, it can be used as a balancing tool because our planetary system is fundamentally balanced through the hyper-surface geometry.

Although not shown, in another exemplary embodiment, the length of the plurality of coils 180C can be varied along the axial direction. More particularly, the length of the plurality of coils 180C can be increased and subsequently decreased along the axial direction.

Although not shown, in another exemplary embodiment, the plurality of coils 180C within each layer of stator 180 and the plurality of rotor plates 150P can be arranged in the axial direction such that respective radii are varied along the axial direction. More particularly, the plurality of coils 180C within each layer of stator 180 can be arranged in the axial direction such that respective radii are linearly increased and subsequently decreased along the axial direction and at the same time, the plurality of rotor plates 150P can be arranged in the axial direction such that respective radii are linearly increased and subsequently decreased along the axial direction. In another exemplary embodiment, the plurality of coils 180C within each layer of stator 180 can be arranged in the axial direction such that respective radii are linearly decreased and subsequently increased along the axial direction and at the same time, the plurality of rotor plates 150P can be arranged in the axial direction such that respective radii are linearly decreased and subsequently increased along the axial direction. In another exemplary embodiment, the plurality of coils 180C within each layer of stator 180 can be structured to form a catenoid hyper-surface and at the same time, the plurality of rotor plates 150P can be structured to form a catenoid hyper-surface. In another exemplary embodiment, the plurality of coils 180C within each layer of stator 180 can be structured to form an inverse-catenoid hyper-surface and at the same time, the plurality of rotor plates 150P can be structured to form an inverse-catenoid hyper-surface. In another exemplary embodiment, the plurality of coils 180C within each layer of stator 180 can be structured to form an inverse-catenoid hyper-surface and at the same time, the plurality of rotor plates 150P can be structured to form a sphere. In yet another exemplary embodiment, the plurality of coils 180C within each layer of stator 180 can be structured to form a sphere and at the same time, the plurality of rotor plates 150P can be structured to form a sphere.

Figure 7:
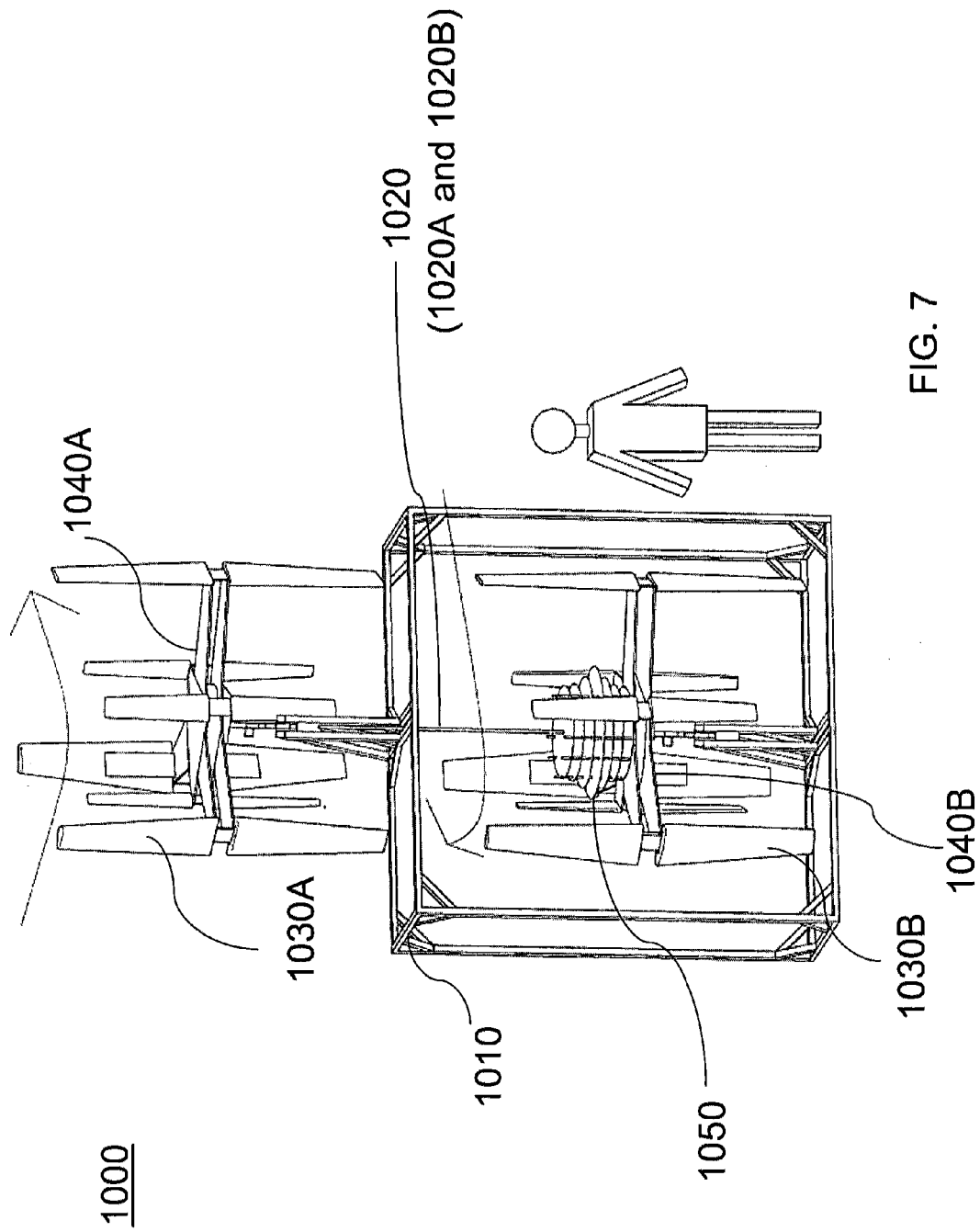
FIG. 7 is a perspective view of a counter-rotating vertical-axis wind turbine (VAWT) generator according to another exemplary embodiment of the present invention.
Figure 8:
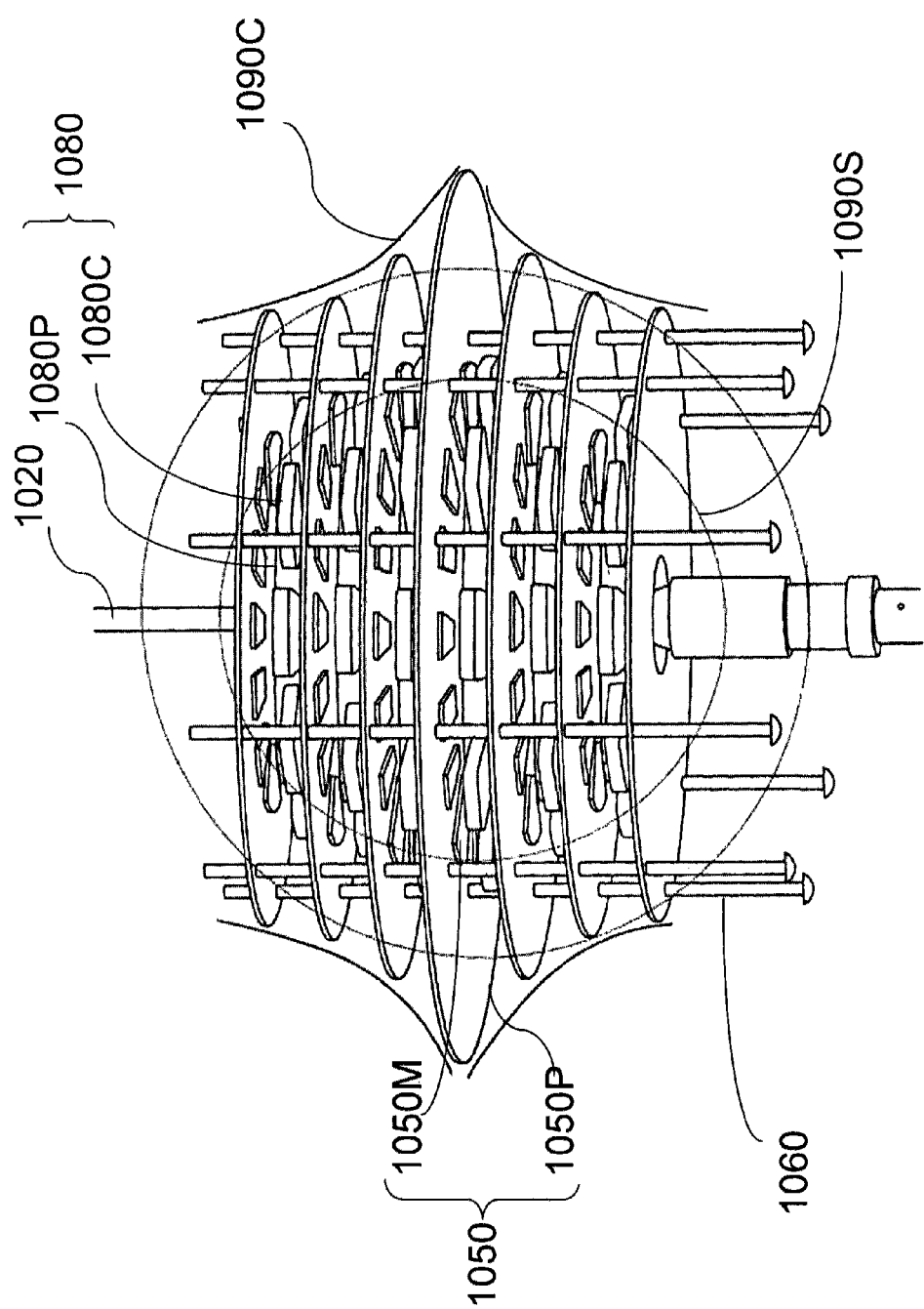
FIG. 8 is a perspective view of a stackable rotors and stators within the counter-rotating VAWT generator according to the exemplary embodiment of FIG. 7.
Figure 9:
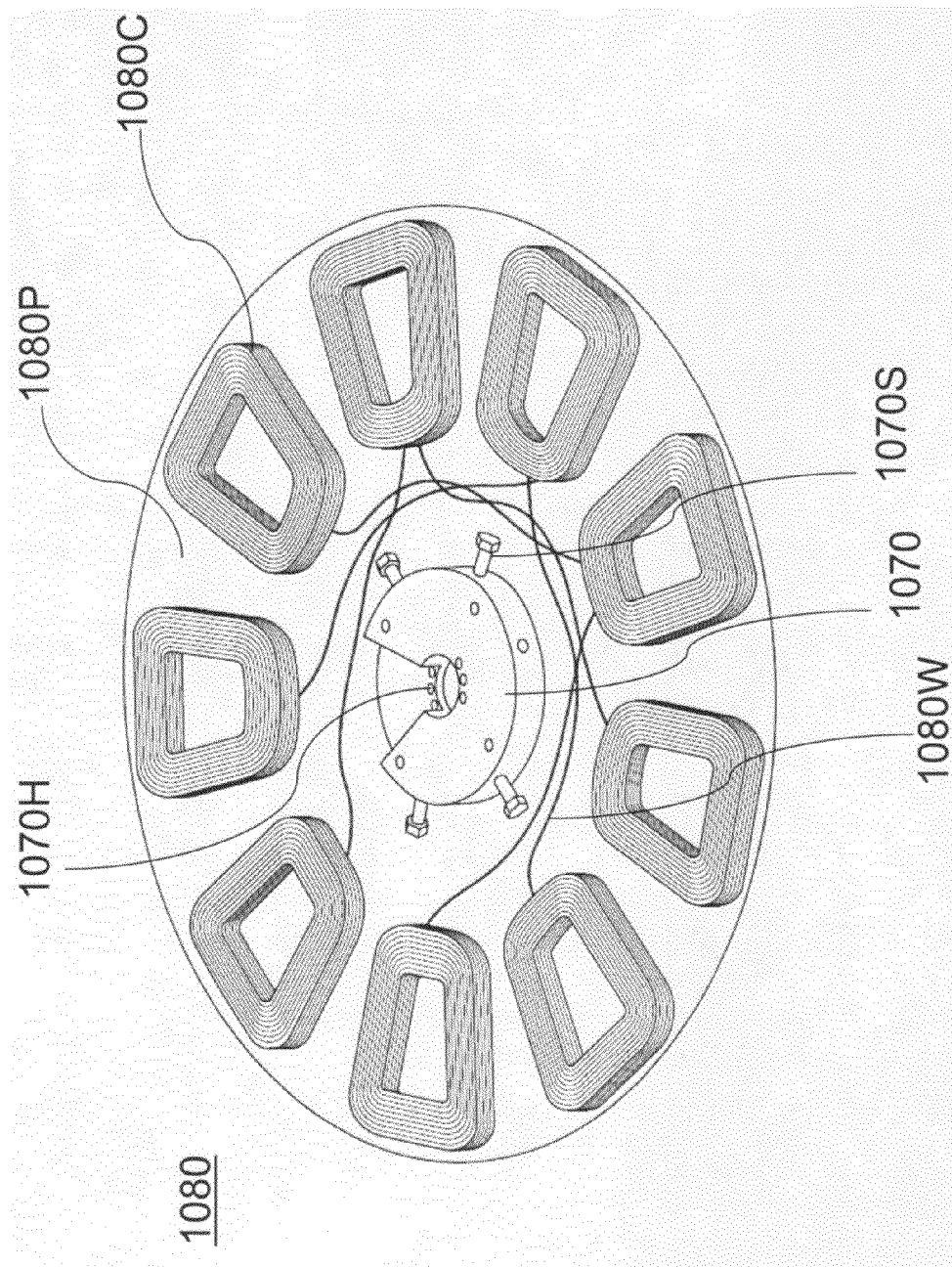
FIG. 9 is a perspective view of a single stator including a plurality of coils within the counter-rotating VAWT generator according to the exemplary embodiment of FIG. 7.
Figure 10:
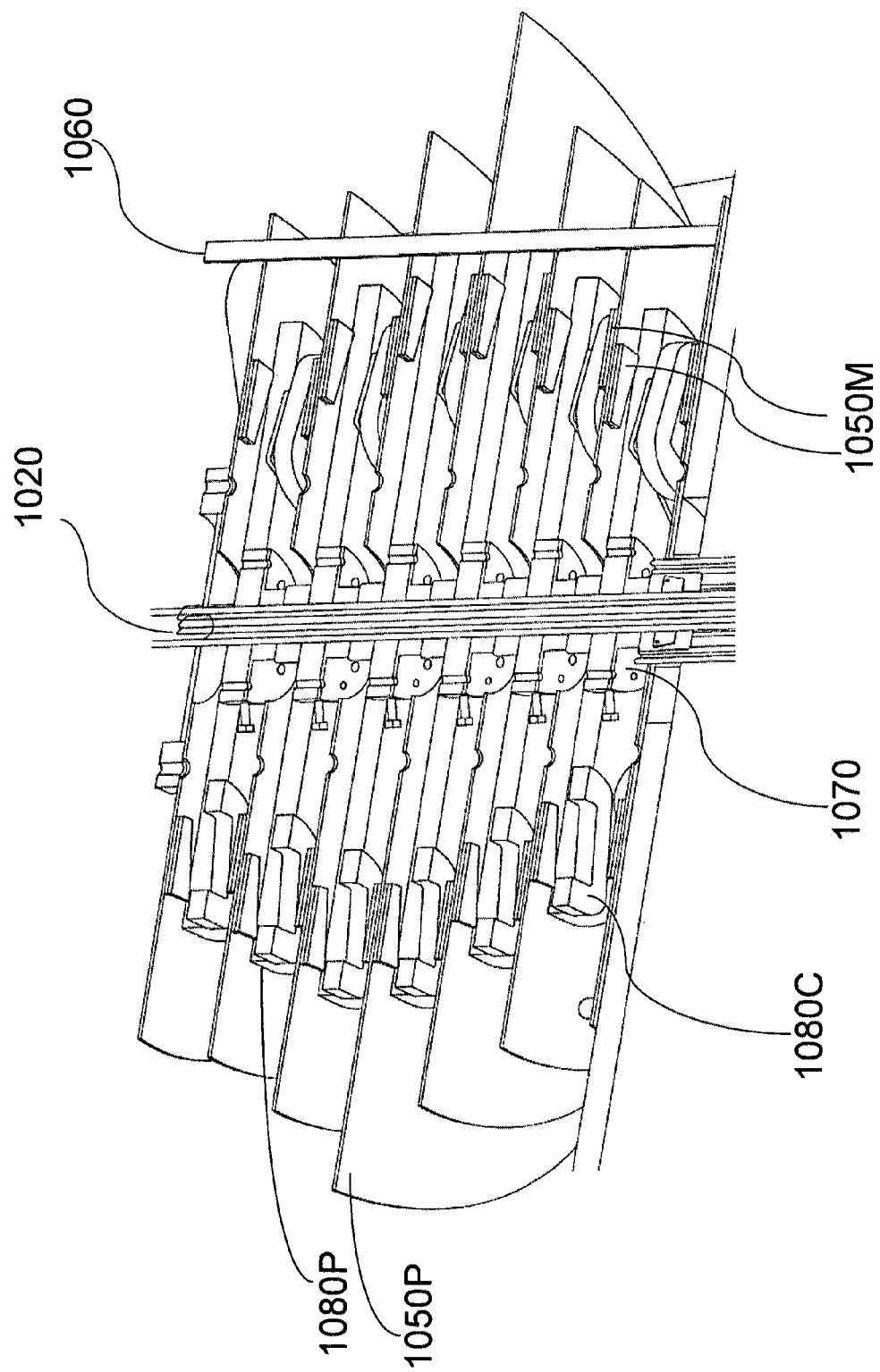
FIG. 10 is a cross-sectional view of a stackable rotors and stators within the counter-rotating VAWT generator according to the exemplary embodiment of FIG. 7.

FIG. 7 is a perspective view of a counter-rotating vertical-axis wind turbine (VAWT) generator according to another exemplary embodiment of the present invention, FIG. 8 is a perspective view of a stackable rotors and stators within the counter-rotating VAWT generator according to the exemplary embodiment of FIG. 7, FIG. 9 is a perspective view of a single stator including a plurality of magnets within the counter-rotating VAWT generator according to the exemplary embodiment of FIG. 7, and FIG. 10 is a cross-sectional view of a stackable rotors and stators within the counter-rotating VAWT generator according to the exemplary embodiment of FIG. 7.

In this exemplary embodiment of the present invention, a counter rotation scheme is implemented to enhance the efficiency. In related art generators, kinetic energy is transformed into rotational energy by rotating the rotors. In this embodiment, rather that having the stators fixed, the stators are connected to an additional independent set of blades that are oriented in the opposite direction with respect to the orientation of the set of blades that are connected to the rotors (which will be referred to as the "first plurality of rotors"). Accordingly, the stators will be referred to as the "second plurality of rotors." In other words, there are first plurality of rotors 1050 and second plurality of rotors 1080 that rotate independently of each other wherein the blades 1030B of the second plurality of rotors 1080 are oriented such that the first plurality of rotors 1050 and the second plurality of rotors 1080 counter-rotate.

An exemplary embodiment of the counter-rotating VAWT generator 1000 according to the present invention includes a frame 1010, a shaft 1020 that is rotatably connected to the frame 1010, a first plurality of blades 1030A that are connected to the shaft 1020 through a first base 1040A, a second plurality of blades 1030B that are connected to the shaft 1020 through a second base 1040B, a first plurality of rotors 1050 that are connected to the inner pipe 1020A of the shaft 1020, and a second plurality of rotors 1080 that are connected to the outer pipe 1020B of the shaft 1020. As shown in FIGS. 7-10, the first plurality of rotors 1050 and the second plurality of rotors 1080 within the counter-rotating VAWTs are vertically arranged.

The first plurality of rotating blades 1030A within the counter-rotating VAWT generator 1000 convert the kinetic energy of the wind into rotational momentum of the inner pipe 1020A. At the same time, the second plurality of rotating blades 1030B converts the same kinetic energy of the wind into a rotational momentum of the outer pipe 1020B, which rotates in the opposite direction of the inner pipe 1020A. Because the first plurality of rotors 1050 rotate in the opposite direction of the second plurality of rotors 1080, the plurality of coils 1080C and the wires 1080W within the second plurality of rotors 1080 experiences twice as fast of a change in the magnetic field generated by the plurality of permanent magnets 1050M within the first plurality of rotors 1050. Accordingly, electricity is generated in the plurality of coils 1080C and wires 1080W within the second plurality of rotors 1080 more efficiently.

As shown in FIGS. 8 and 10, a first plurality of rotors 1050 includes a first plurality of rotor plates 1050P and a plurality of alternating magnets 1050M. The first plurality of rotor plates 1050P are fixed with one another by rods 1060. As shown in FIG. 9, there are three sets of wires 1080W on each second plurality of rotors 1080 that electrically connect the plurality of coils 1080C to one another within a single rotor plate 1080P. Of course, more or fewer sets of wires can be used. Although not completely shown, each coil 1080C has input and output wires. The input and output wires of each coil that form the three pairs of wires 1080W that electrically connect the plurality of coils 1080C to one another are shown in FIG. 3. However, the input and output wires of each coil that are connected to pass through the holes 1070H within the hub 1070 are not shown. Stabilizing screws 1070S can be used to cast the wires together with the hub 1070. The holes 1070H within the hub 1070 are used to pass the wires through to the next stack of rotors 1050 and 1080. The hub 1070 may be made of a metal including aluminum or other suitable material.

FIG. 11A is a perspective view of the counter-rotatable inner pipe within the VAWT generator according to the exemplary embodiment of FIG. 7, FIG. 11B is a perspective view of the counter-rotatable outer pipe within the VAWT generator according to the exemplary embodiment of FIG. 7, and FIG. 11C is a perspective view of the counter-rotating pipes within the VAWT generator according to the exemplary embodiment of FIG. 7.

As shown in FIG. 11A, a pair of inner bearings 1021A, a pair of bearing caps 1022B, and the inner pipe holder 1023 are formed to allow the inner pipe 1020A to freely rotate against the inner bearing 1021A. As shown in FIG. 11B, the shaft 1020 comprises an inner pipe 1020A and an outer pipe 1020B that are spaced apart and do not touch each other. The outer bearing 1021B and the outer bearing cap 1022B are components attached on the top are bottom of the outer pipe 1020B. The inner circumference of outer bearing 1021B holds the inner pipe 1020A. This allows the outer pipe 1020B to rotate freely along the axis parallel to the inner pipe 1020A. FIG. 11C shows a complete assembly of the counter-rotating pipes 1020A and 1020B, which comprises two sets of bearings that hold each pipe so that each can rotate freely in opposite directions.

Figure 12A:
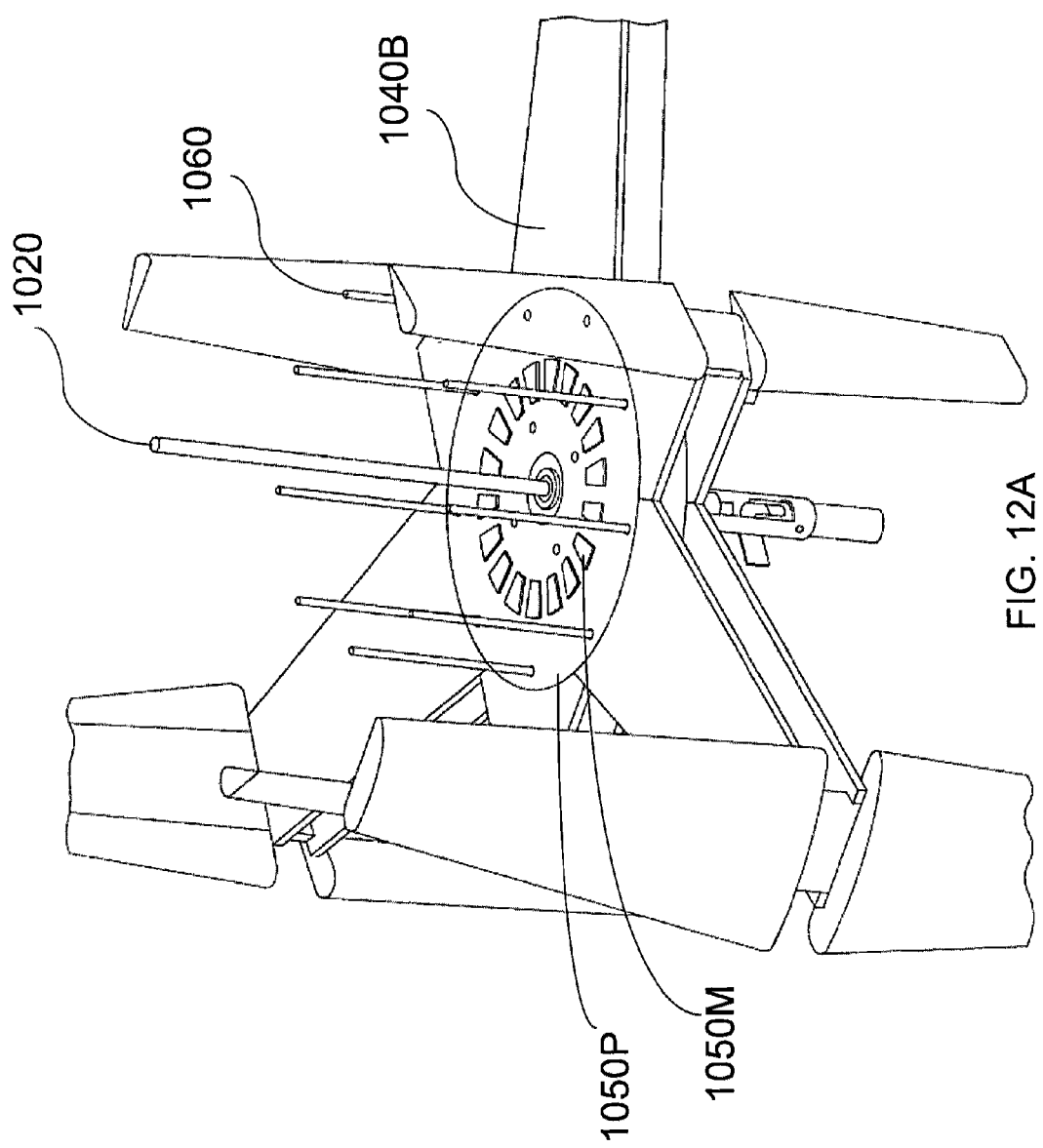
Figure 12C:
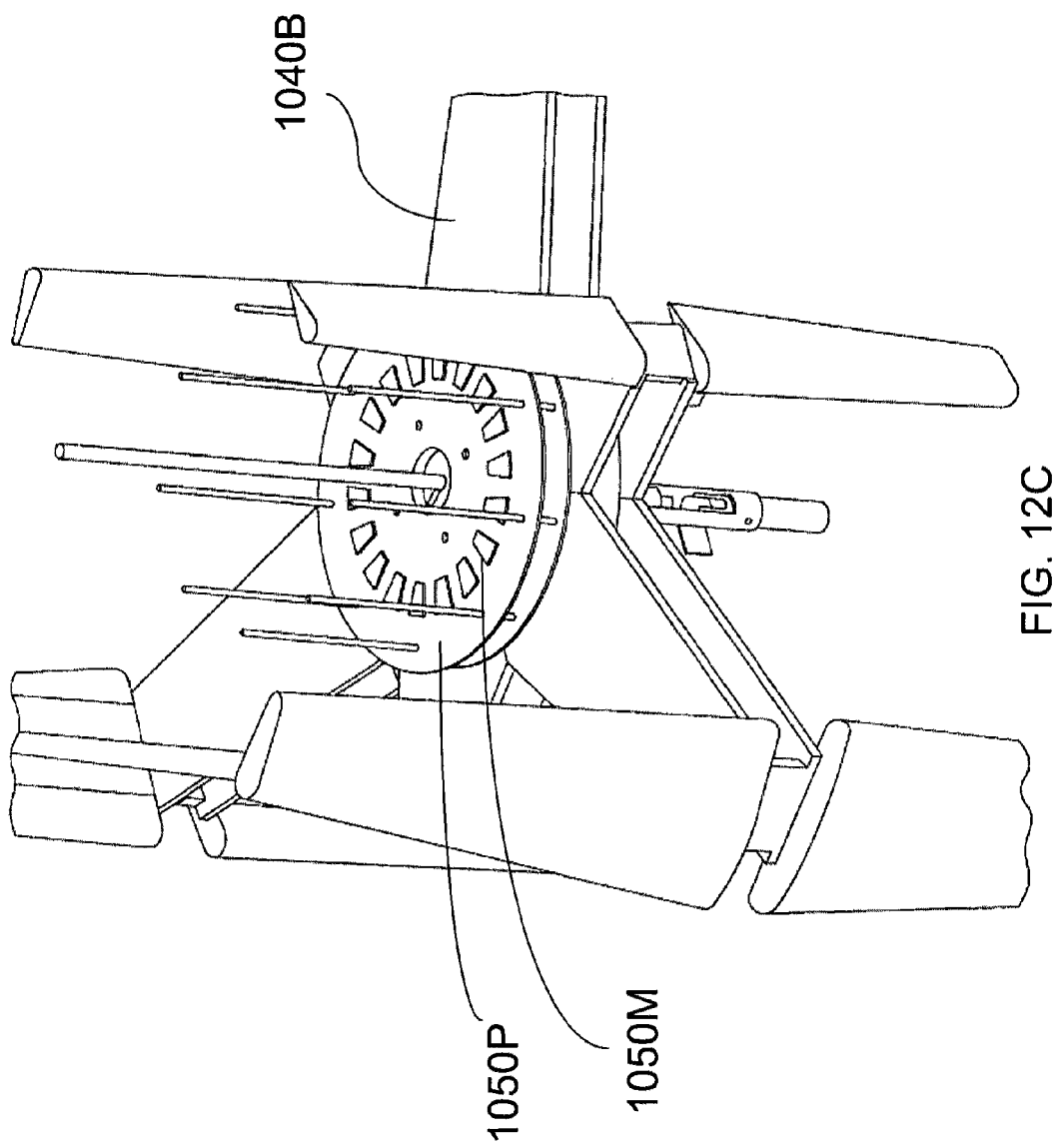

FIGS. 12A-12C are perspective views showing the method of making the counter-rotating VAWT generator according to the exemplary embodiment of the present invention. As shown in FIG. 12A, the first layer of a first plurality of rotor plates 1050P is inserted into the shaft 1020 and rods 1060 and a first layer of the plurality of alternating magnets 1050M are formed thereon. Subsequently, as shown in FIG. 12B, the first layer of a second plurality of rotor plates 1080P is inserted into the shaft 1020 and a first layer of the plurality of coils 1080C are formed thereon. In addition, a hub 1070 and a counter-rotatable outer pipe (not shown) are formed to fix the second plurality of rotor plates 1080P. Then, as shown in FIG. 12C, the second layer of a first plurality of rotor plates 1050P is inserted into the shaft 1020 and rods 1060 and a second layer of the plurality of alternating magnets 1050M are formed thereon. One of ordinary skill in the art would recognize that this sequence can be repeated until a desired number of layers are formed.

Similar to the VAWT generator according to the first exemplary embodiment, the first and second plurality of blades 1030A and 1030B of the wind generator 1000 are designed to convert linear motions of wind into rotational motions of the first and second plurality of rotors 1050 and 1080. Because the first and second plurality of blades 1030A and 1030B are generally not ideal and also because the direction of wind is generally not homogeneous in space, the first and second plurality of rotors 1050 and 1080 not only have spin angular momentum when external torque is applied to the first and second plurality of blades 1030A and 1030B, but also have non-zero orbital angular momentum, which would cause vibration of the wind generator 1000 and further generate friction between the first and second plurality of rotors 1050 and 1080. Accordingly, having a non-zero orbital angular momentum would decrease the spin angular momentum, thereby degrading the efficiency of the wind generator 1000.

Figure 13:
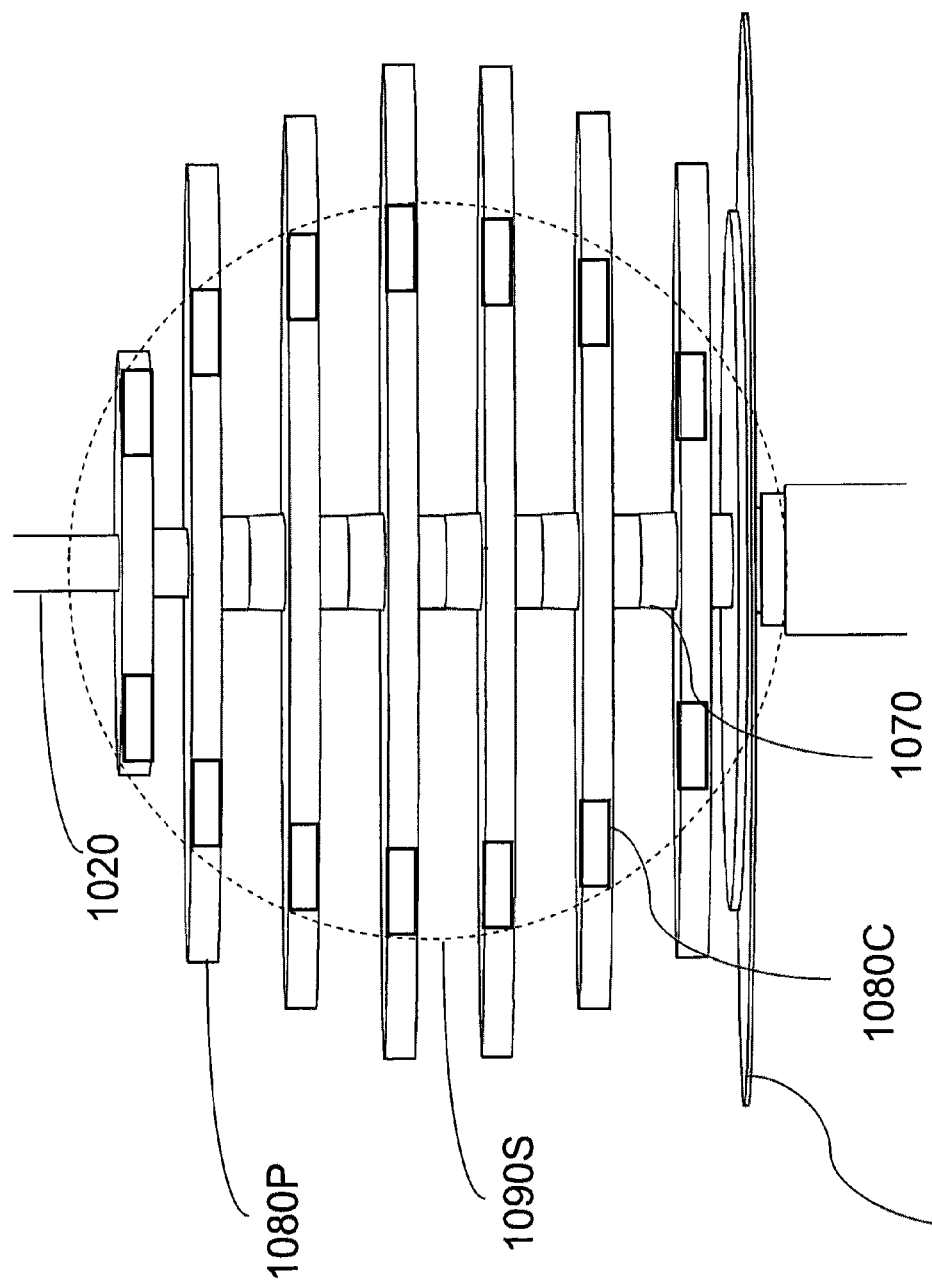
FIG. 13 is a side view of the stackable stators within the counter-rotating VAWT generator according to the exemplary embodiment of FIG. 7.

In the exemplary embodiments of the present invention, the geometric dimensions of the first and second plurality of rotors 1050 and 1080 are designed to suppress the orbital angular momentum thereby enhancing the reliability and stability of the wind generator. FIG. 13 is a side view of the stackable rotors within the counter-rotating VAWT generator according to the exemplary embodiment of FIG. 7. In FIG. 13, the first plurality of rotors 1050 are not shown to simplify the structure. As shown in FIG. 13, the plurality of coils 1080C within the second plurality of rotors 1080 are structured to form a sphere 1090S. On the other hand, as shown in FIG. 8, the first plurality of rotor plates 1050p are structured to form an inverse-catenoid hyper-surface 1090C. A catenoid and inverse-catenoid hyper-surfaces are pseudo-spheres that have the same surface area as a sphere. Accordingly, an advantage of having either a catenoid or inverse-catenoid configuration is to have a larger radial center of mass, while maintaining the surface area of the entire generator 100.

Although not shown, in another exemplary embodiment, the length of the plurality of coils 1080C can be varied along the axial direction. More particularly, the length of the plurality of coils 1080C can be increased and subsequently decreased along the axial direction.

Although not shown, in another exemplary embodiment, the first plurality of rotor plates 1050P and the plurality of coils 1080C can be arranged in the axial direction such that respective radii are varied. In another exemplary embodiment, the first plurality of rotor plates 1050P can be arranged in the axial direction such that respective radii are linearly increased and subsequently decreased along the axial direction and at the same time, the plurality of coils 1080C can be arranged in the axial direction such that respective radii are linearly increased and subsequently decreased along the axial direction. In another exemplary embodiment, the first plurality of rotor plates 1050P can be arranged in the axial direction such that respective radii are linearly decreased and subsequently increased along the axial direction and at the same time, the plurality of coils 1080C can be arranged in the axial direction such that respective radii are linearly decreased and subsequently increased along the axial direction. In another exemplary embodiment, the first plurality of rotor plates 1050P can be structured to form a catenoid hyper-surface and at the same time, the plurality of coils 1080C can be structured to form a catenoid hyper-surface. In another exemplary embodiment, the first plurality of rotor plates 1050P can be structured to form an inverse catenoid hyper-surface and at the same time, the plurality of coils 1080C can be structured to form an inverse catenoid hyper-surface. In another exemplary embodiment, the first plurality of rotor plates 1050P can be structured to form a sphere and at the same time, the plurality of coils 1080C can be structured to form an inverse catenoid hyper-surface. In yet another exemplary embodiment, the first plurality of rotor plates 1050P can be structured to form a sphere and at the same time, the plurality of coils 1080C can be structured to form a sphere.

Figure 14:
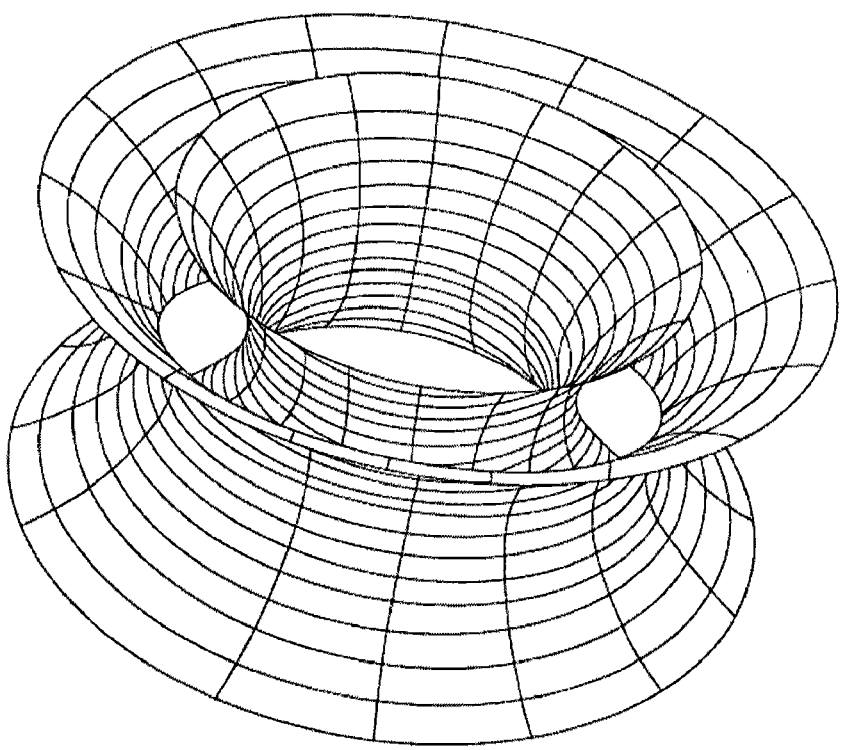
FIG. 14 is a perspective view of a catenoid within a catenoid.
Figures 15A, 15B, 15C:
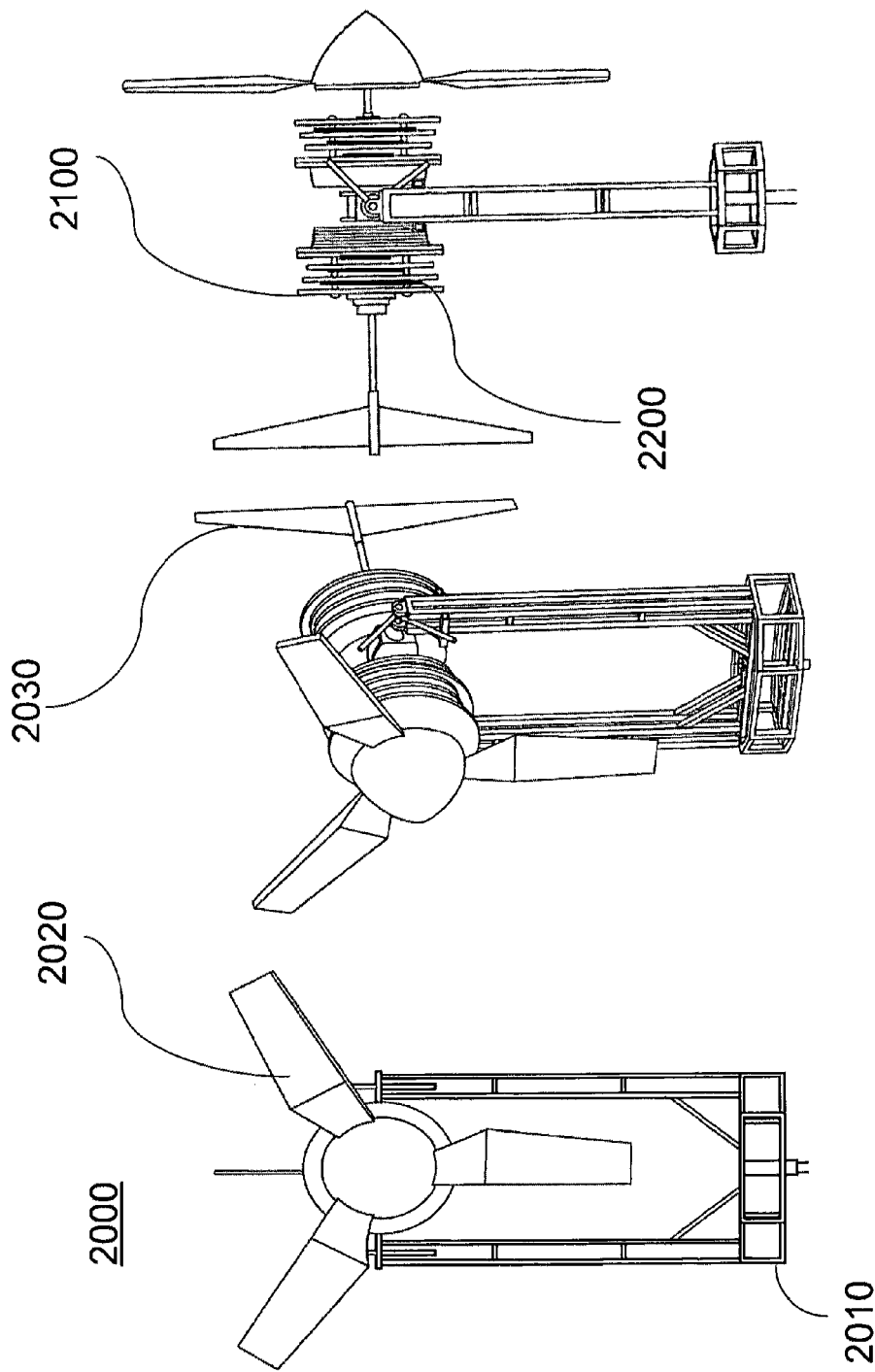
FIGS. 15A-C are front view, perspective view, and side view of a horizontal-axis wind turbine (HAWT) generator according to another exemplary embodiment of the present invention.
Figure 16:
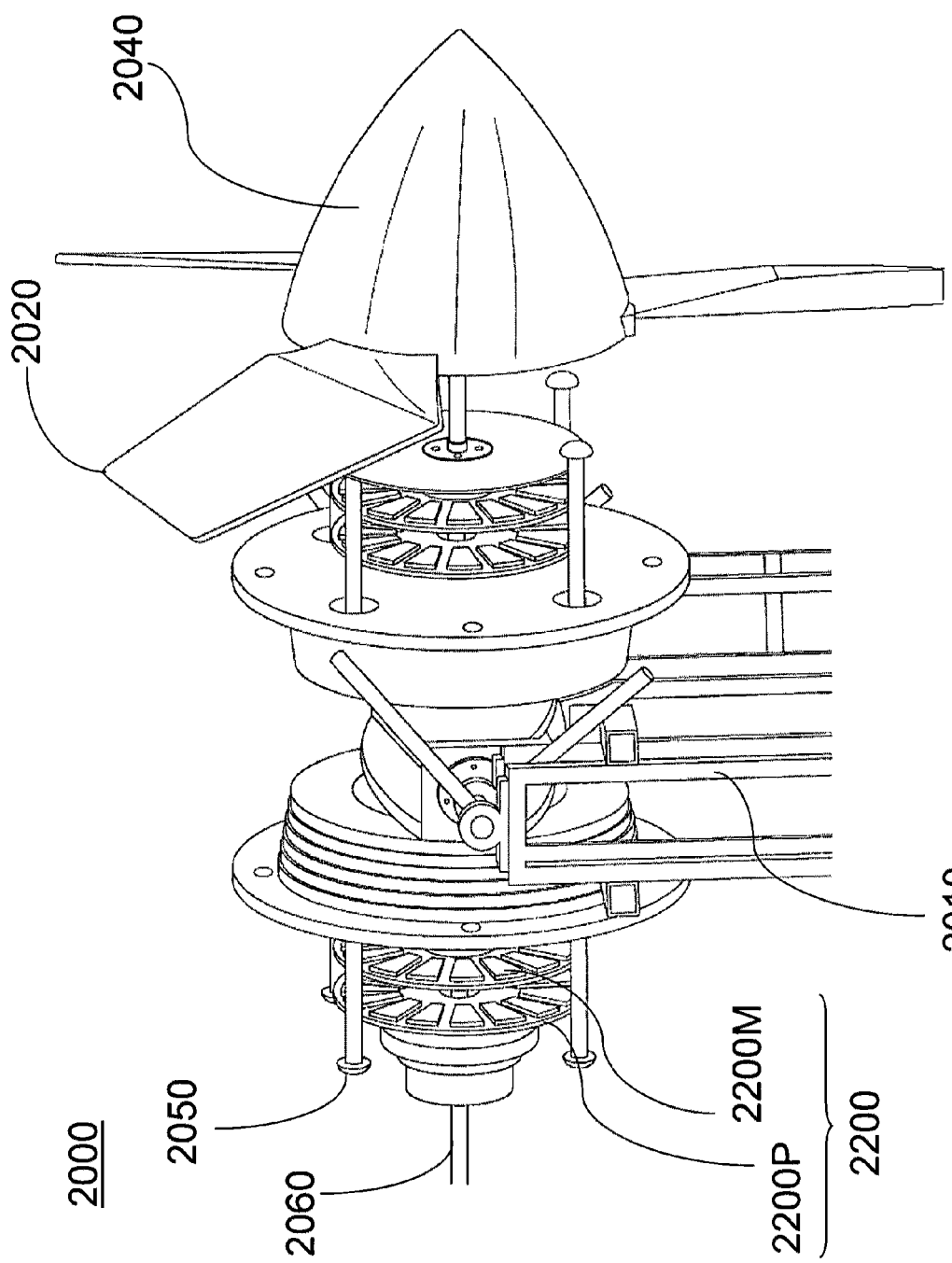
FIG. 16 is a perspective view of a stackable rotors within the HAWT generator according to the exemplary embodiment of FIGS. 15A-C.
Figure 17:
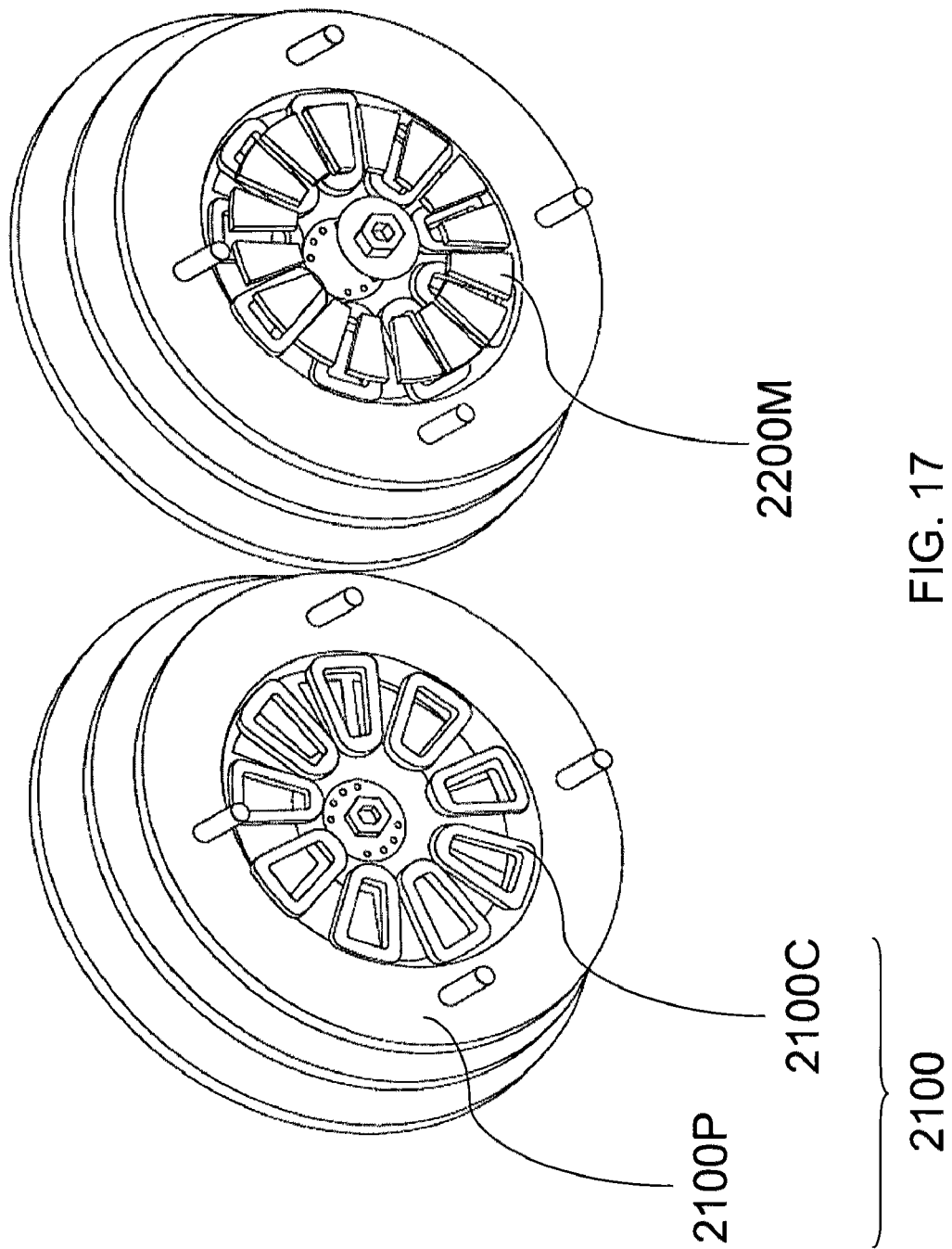
FIG. 17 is a perspective view of a stackable rotors and stators within the HAWT generator according to the exemplary embodiment of FIGS. 15A-C.

An exemplary embodiment wherein the plurality of stators and the plurality of rotors form catenoid hyper-surfaces, thereby forming a catenoid within a catenoid, will be shown in a horizontal-axis wind turbine (HAWT) generator configuration. FIG. 14 is a perspective view of a catenoid within a catenoid. FIGS. 15A-C are front view, perspective view, and side view of a horizontal-axis wind turbine (HAWT) generator according to another exemplary embodiment of the present invention, FIG. 16 is a perspective view of a stackable rotors within the HAWT generator according to an exemplary embodiment of FIGS. 15A-C, FIG. 17 is a perspective view of a stackable rotors and stators within the HAWT generator according to the exemplary embodiment of FIGS. 15A-C, and FIG. 18 is a side view of a stackable rotors and stators within the HAWT generator according to the exemplary embodiment of FIGS. 15A-C.

An exemplary embodiment of the HAWT generator 2000 according to the present invention includes a frame 2010, a plurality of blades 2020 that are connected to the shaft 2060, which is rotationably connected to the frame 2010, a tail 2030, a cover 2040, a plurality of rods 2050, a plurality of stators 2100 including a plurality of stator plates 21OOP and a plurality of coils 2100C, and a plurality of rotors 2200 including a plurality of rotor plates 2200P and a plurality of permanent magnets 2200M.

As shown in FIGS. 15A-18, the rotating blades 2020 within the HAWT generator 2000 convert the kinetic energy of the wind into rotational momentum of a shaft 2060. The blades 2020 use engineered airfoils that capture the energy of the wind. However, unlike VAWT generators, the cover 2040 must face the wind for the conversion of kinetic energy of wind into rotational momentum of the shaft 2060. The tail 2030 allows the wind generator 2000 to track the direction of the wind as the wind shifts direction, thereby enabling the cover 2040 and the blades 2020 to turn accordingly to face the wind.

When the plurality of rotors 2200 rotate, the plurality of coils 2100C within the plurality of stators 2100 experience change in the magnetic field generated by the plurality of permanent magnets 2200M within the plurality of rotors 2200. Accordingly, electricity is generated in the plurality of coils 2100C within the plurality of stator 2100.

The plurality of blades 2020 of the wind generator 2000 are designed to convert linear motions of wind into rotational motions of the plurality of rotors 2200. In an ideal condition, the plurality of rotors 2200 would only have spin angular momentum wherein the plurality of rotors 2200 rotates around the shaft 2060. However, because the blades 2020 are not ideal and also because the direction of wind is not homogeneous in space, the plurality of rotors 2200 not only have spin angular momentum when external torque is applied to the blades 2020, but also have non-zero orbital angular momentum, which contributes to decreasing the spin angular momentum thereby degrading the efficiency of the wind generator 2000.

Figure 18:
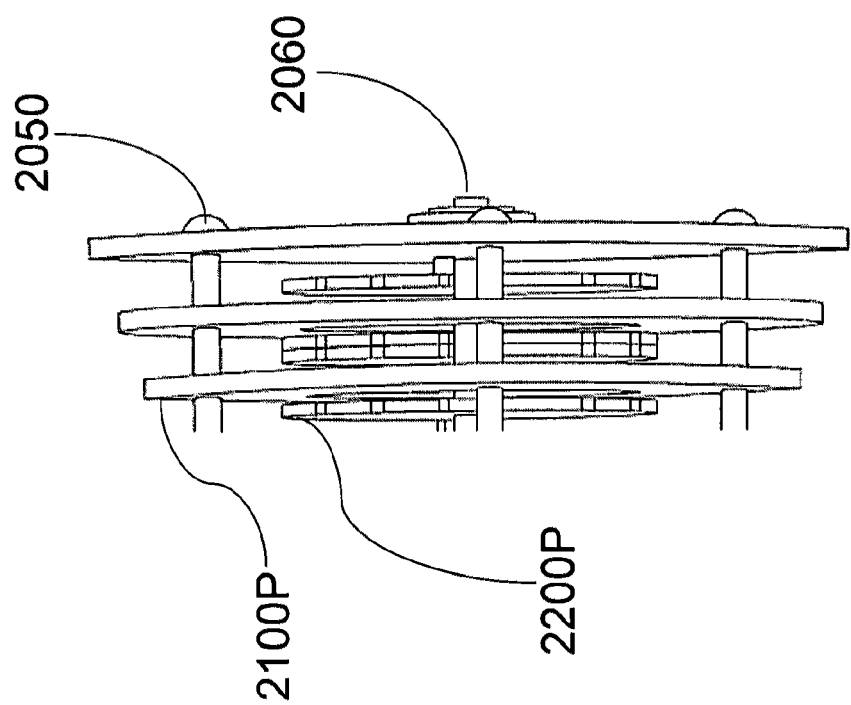
FIG. 18 is a side view of a stackable rotors and stators within the HAWT generator according to the exemplary embodiment of FIGS. 15A-C.

In the exemplary embodiment of the present invention, the geometric dimensions of the plurality of rotors 2200 and the plurality of stators 2100 are designed to suppress the orbital angular momentum thereby enhancing the reliability and stability of the wind generator. As shown in FIG. 15C, the plurality of stators 2100 and the plurality of rotors 2200 can form catenoid hyper-surfaces, thereby forming a catenoid within a catenoid. In addition, as shown in FIG. 18, the plurality of stator plates 2100P can be structured to form a catenoid hyper-surface while the plurality of rotor plates 2200P are structured to form a cylinder.

Although not shown, in another exemplary embodiment, the plurality of stator plates 2100P can be structured to form an inverse catenoid hyper-surface while the plurality of rotor plates 2200P are structured to form a cylinder. In another exemplary embodiment, the plurality of stator plates 2100P can be structured to form an inverse catenoid hyper-surface while the plurality of rotor plates 2200P are structured to form a sphere. In yet another exemplary embodiment, both the plurality of stator plates 2100P and the plurality of rotor plates 2200P can be structured to form either an inverse-catenoid hyper-surface or a sphere.

It will be apparent to those skilled in the art that various modifications and variations can be made in the stackable hyper-surface wind generator of the present invention without departing from the spirit or scope of the invention. Thus, it is intended that the present invention cover the modifications and variations of this invention provided they come within the scope of the appended claims and their equivalents.

What is claimed is:

1. An electric generator capable of generating electric power using kinetic energy of wind, comprising:
   a plurality of stator plates;
   a plurality of rotor plates; and
   a plurality of blades capable of driving the plurality of rotor plates;
   wherein rotation of the plurality of rotor plates relative to the plurality of stator plates induces electricity in a plurality of coils disposed on each stator plate; and
   wherein at least one of the stator plates and the rotor plates are arranged co-axially with a shaft such that respective radii are increased and subsequently decreased along the axial direction.

2. The electric generator according to claim 1, wherein the at least one of the stator plates and rotor plates are arranged in the axial direction with the respective radii varied to define an inverse catenoid.

3. The electric generator according to claim 1, wherein the at least one of the stator plates and rotor plates are arranged in the axial direction with the respective radii varied to define a sphere.

4. The electric generator according to claim 1, wherein the stator plates are arranged in the axial direction with the respective radii varied to define an inverse catenoid and wherein a plurality of magnets disposed on each rotor plate are arranged in the axial direction with the respective radii varied to define a sphere.

5. The electric generator according to claim 1, wherein the rotor plates are arranged in the axial direction with the respective radii varied to define an inverse catenoid and the plurality of coils are arranged in the axial direction with the respective radii varied to define a sphere.

6. An electric generator capable of generating electric power using kinetic energy of wind, comprising:
   a plurality of stator plates;
   a plurality of rotor plates; and
   a plurality of blades capable of driving the plurality of rotor plates;

wherein rotation of the plurality of rotor plates relative to the plurality of stator plates induces electricity in a plurality of coils disposed on each stator plate; and wherein the at least one of the stator plates and rotor plates are arranged in the axial direction such that respective radii are decreased and subsequently increased along the axial direction.

7. The electric generator according to claim 6, wherein the at least one of the stator plates and rotor plates are arranged in the axial direction with the respective radii varied to define a catenoid.

8. The electric generator according to claim 6, wherein the stator plates and the rotor plates are arranged in the axial direction with the respective radii varied to each define a catenoid, thereby forming a catenoid within a catenoid.

9. The electric generator according to claim 1, further comprising a tail that tracks a direction of wind.

* * * * *